(12) United States Patent
Bramley et al.

(10) Patent No.: US 12,210,408 B2
(45) Date of Patent: Jan. 28, 2025

(54) REMAPPING AT LEAST ONE OF A GUARD TAG AND AN ADDRESS TAG ASSOCIATED WITH A TARGET ADDRESS TO GENERATE A REMAPPED TAG FOR USE IN TAG CHECKING

(71) Applicant: Arm Limited, Cambridge (GB)

(72) Inventors: Jacob Paul Bramley, Cambridge (GB); Georgia Kouveli, Cambridge (GB); Martyn Maurice Capewell, Cambridge (GB); Pierre Denis Michel Langlois, Cambridge (GB)

(73) Assignee: Arm Limited, Cambridge (GB)

( * ) Notice: Subject to any disclaimer, the term of this patent is extended or adjusted under 35 U.S.C. 154(b) by 93 days.

(21) Appl. No.: 17/999,780

(22) PCT Filed: May 27, 2021

(86) PCT No.: PCT/GB2021/051291
§ 371 (c)(1),
(2) Date: Nov. 23, 2022

(87) PCT Pub. No.: WO2021/240160
PCT Pub. Date: Dec. 2, 2021

(65) Prior Publication Data
US 2023/0236925 A1  Jul. 27, 2023

(30) Foreign Application Priority Data

May 29, 2020 (EP) ..................................... 20386028

(51) Int. Cl.
*G06F 11/07* (2006.01)
*G06F 12/14* (2006.01)

(52) U.S. Cl.
CPC ........ *G06F 11/0793* (2013.01); *G06F 11/073* (2013.01); *G06F 12/145* (2013.01); *G06F 2212/1052* (2013.01)

(58) Field of Classification Search
CPC ... G06F 11/0793; G06F 11/073; G06F 12/145
See application file for complete search history.

(56) References Cited

U.S. PATENT DOCUMENTS 5,845,331 A * 12/1998 Carter ................... G06F 12/145
                                                          711/163
8,645,611 B2 * 2/2014 Tian ........................ G06F 13/28
                                                          711/6

(Continued)

FOREIGN PATENT DOCUMENTS

| GB | 2572158 A | 9/2019 | |
| WO | WO-2019141960 A1 * | 7/2019 | ............ G06F 11/141 |
| WO | 2019/150081 A1 | 8/2019 | |

OTHER PUBLICATIONS

Office Action for EP Application No. 20386028.3 dated May 25, 2023, 7 pages.

(Continued)

*Primary Examiner* — Joseph O Schell
(74) *Attorney, Agent, or Firm* — NIXON & VANDERHYE P.C.

(57) ABSTRACT

An apparatus has tag checking circuitry responsive to a target address to: identify a guard tag stored in a memory system in association with a block of one or more memory locations, the block containing a target memory location identified by the target address, perform a tag check based on the guard tag and an address tag associated with the target address, and in response to detecting a mismatch in the tag check, perform an error response action. The apparatus also has tag mapping storage circuitry to store mapping information indicative of a mapping between guard tag values (Continued)

and corresponding address tag values. The tag checking circuitry remaps at least one of the guard tag and the address tag based on the mapping information stored by the tag mapping storage circuitry to generate a remapped tag for use in the tag check.

15 Claims, 15 Drawing Sheets

(56) References Cited

U.S. PATENT DOCUMENTS

| | | | | |
|---|---|---|---|---|
| 11,327,903 | B2* | 5/2022 | Barnes | G06F 11/141 |
| 11,573,907 | B2* | 2/2023 | Ayrapetyan | G06F 12/1027 |
| 11,775,445 | B2* | 10/2023 | Helms | G06F 12/1009 |
| | | | | 711/122 |
| 2003/0200412 | A1* | 10/2003 | Peinado | G06F 12/145 |
| | | | | 711/202 |
| 2007/0283115 | A1* | 12/2007 | Freeman | G06F 12/1475 |
| | | | | 711/163 |
| 2016/0321186 | A1* | 11/2016 | Deutschle | G06F 12/1009 |
| 2018/0219795 | A1* | 8/2018 | Cameron | G06F 9/4856 |
| 2018/0365165 | A1* | 12/2018 | Brandt | G06F 12/1009 |
| 2019/0196977 | A1* | 6/2019 | Cong | G06F 12/10 |

OTHER PUBLICATIONS

"Armv8.5-A Memory Tagging Extension".
"Armv8.5-A Memory Tagging Extension" Oct. 9, 2019.

* cited by examiner

REMAPPING AT LEAST ONE OF A GUARD TAG AND AN ADDRESS TAG ASSOCIATED WITH A TARGET ADDRESS TO GENERATE A REMAPPED TAG FOR USE IN TAG CHECKING

The present technique relates to the field of data processing. More particularly, the invention relates to performing a tag check.

Software to be executed by a data processing apparatus may typically be written in a high-level programing language and then compiled into code according to the instruction set architecture supported by the apparatus on which the software is to be executed. For example, the software may originally be written in a higher level language such as Java, C or C++, and then compiled into a natively supported instruction set architecture (ISA) such as x86 or Arm®. Some higher level programing languages, such as Java, are considered memory-safe languages because they include run time error detection checks for checking for certain errors relating to memory accesses. In contrast, memory-unsafe languages, such as C and C++, do not include such run time error checks. The enduring prevalence of use of memory-unsafe languages means that in compiled code according to a given instruction set architecture, there may be a large number of memory related errors which may be vulnerable to exploitation by an attacker or other malicious party. Such errors may include:

Bounds violations, in which an array index supplied by the code is outside the legitimate bounds of the array;

Use-after-free errors, in which an access to a memory location is made after that memory location has already be deallocated or freed;

Use-after-return, in which a memory access to an address associated with a variable used within a function (such as a value on a stack) is made after already returning from the function;

Use-out-of-scope errors, in which variables are accessed outside of the scope in which they are declared; and Use-before-initialisation errors, in which a memory address associated with a variable is accessed before the variable has been initialised.

These are just some examples of memory-related errors which can result in unpredictable behaviour and potentially provide avenues for attackers to exploit.

At least some examples provide an apparatus comprising: tag checking circuitry responsive to a target address to: identify a guard tag stored in a memory system in association with a block of one or more memory locations, the block containing a target memory location identified by the target address; perform a tag check based on the guard tag and an address tag associated with the target address; and in response to detecting a mismatch in the tag check, perform an error response action; and tag mapping storage circuitry to store mapping information indicative of a mapping between guard tag values and corresponding address tag values; wherein, the tag checking circuitry is configured to remap at least one of the guard tag and the address tag based on the mapping information stored by the tag mapping storage circuitry to generate a remapped tag for use in the tag check.

At least some examples provide a method comprising the steps: in response to a target address: identifying a guard tag stored in a memory system in association with a block of one or more memory locations, the block containing a target memory location identified by the target address; performing a tag check based on the guard tag and an address tag associated with the target address; and performing, in response to detecting a mismatch in the tag check, an error response action; wherein the method comprises remapping at least one of the guard tag and the address tag based on mapping information indicative of a mapping between guard tag values and corresponding address tag values to generate a remapped tag for use in the tag check.

At least some examples provide a computer program for controlling a host data processing apparatus to provide an instruction execution environment comprising: tag checking program logic responsive to a target address to: identify a guard tag stored in a memory system in association with a block of one or more memory locations, the block containing a target memory location identified by the target address; and perform a tag check based on the guard tag and an address tag associated with the target address; in response to detecting a mismatch in the tag check, perform an error response action; and tag mapping maintenance program logic to maintain mapping information indicative of a mapping between guard tag values and corresponding address tag values; wherein, the tag checking program logic is configured to remap at least one of the guard tag and the address tag based on the mapping information maintained by the tag mapping maintenance program logic to generate a remapped tag for use in the tag check.

A storage medium may store the computer program described above. The storage medium may be a non-transitory storage medium.

Further aspects, features, and advantages of the present technique will be apparent from the following description of examples, which is to be read in conjunction with the accompanying drawings.

FIG. 1 schematically illustrates an example of a data processing apparatus;

Figure 12:
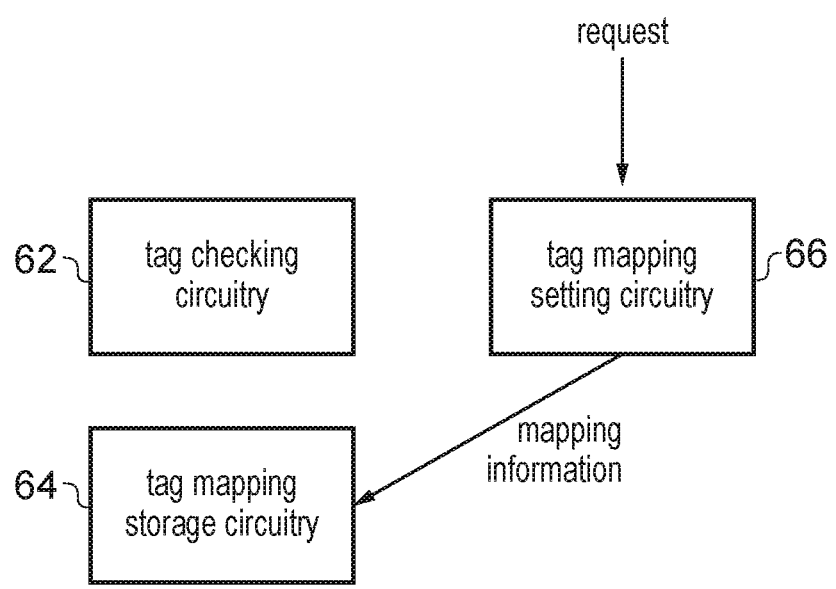
Figure 13:
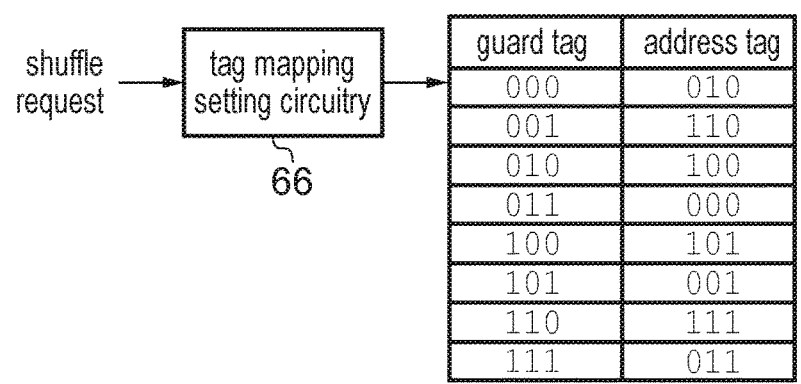
Figure 14:
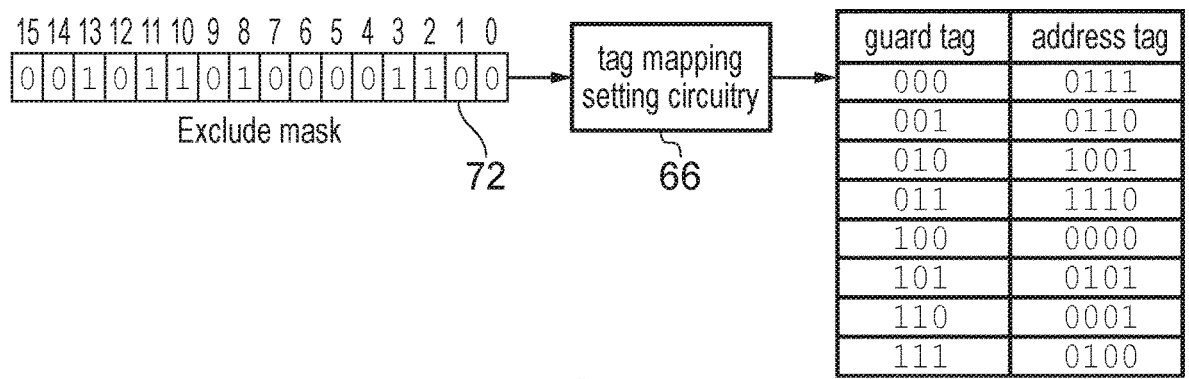
Figure 15:
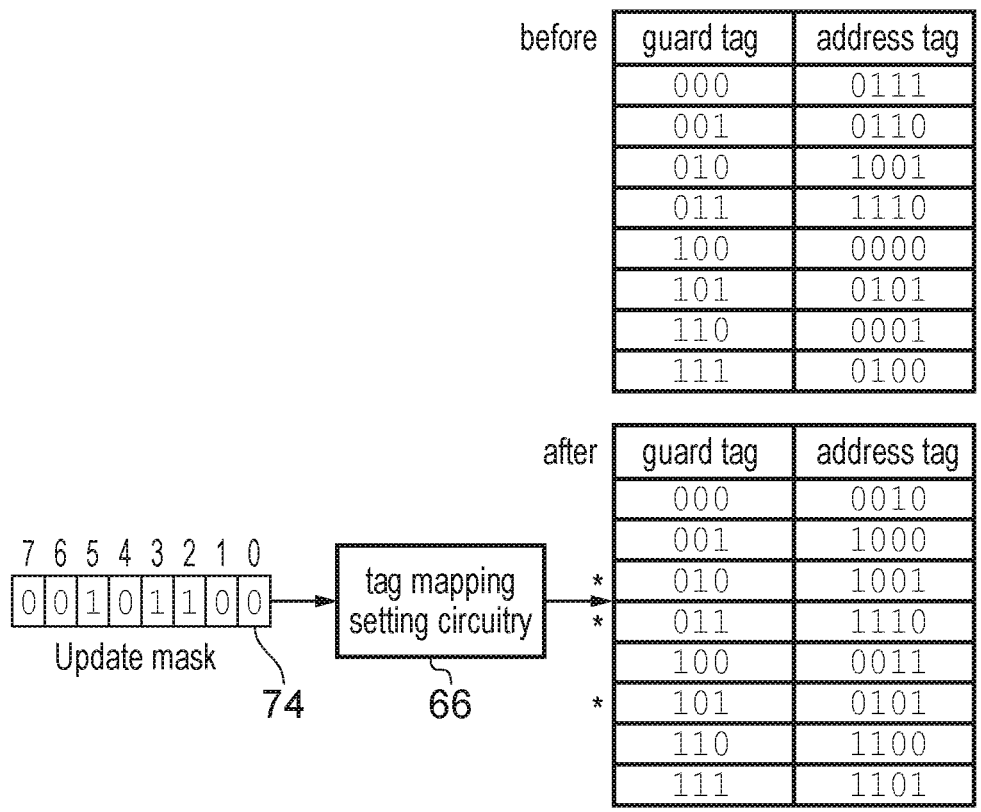
Figure 16:
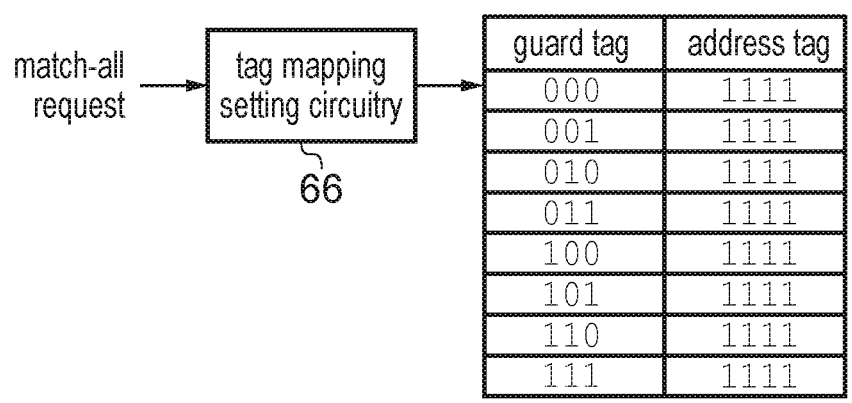
Figure 17:
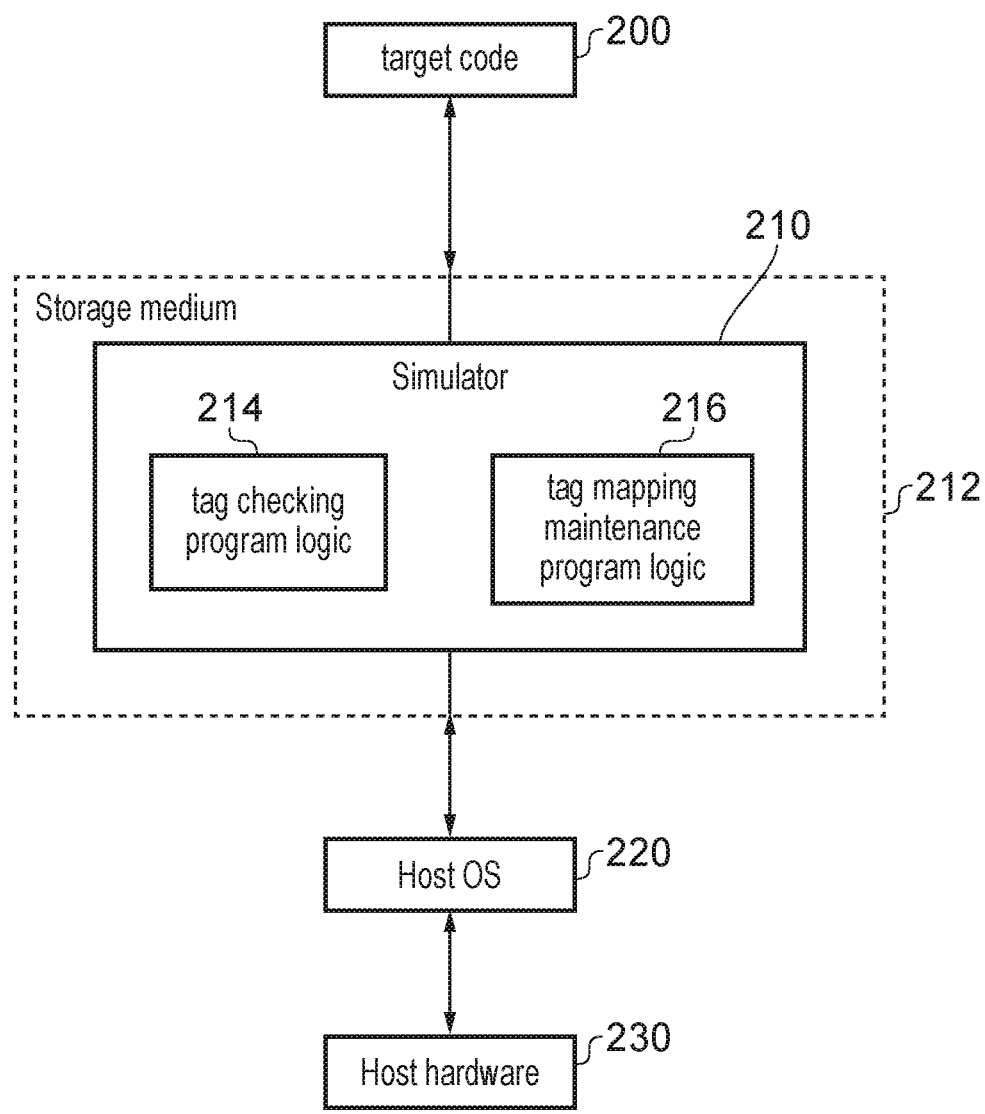

FIG. 12 schematically illustrates an apparatus for setting tag mappings;

FIG. 13 shows an example of setting a tag mapping in which each guard tag value is associated with a different address tag value;

FIG. 14 shows an example of setting a tag mapping in which certain address tag values are excluded from selection;

FIG. 15 shows an example of updating a tag mapping in which certain guard tag vales are excluded from the update;

FIG. 16 shows an example of setting a tag mapping in which all guard tag values are mapped to the same address tag value; and FIG. 17 shows an example of a simulator supporting tag checking and tag remapping.

Some specific examples are described below. It will be appreciated that the invention is not limited to these exact examples.

One approach for protecting against certain memory usage errors of the type discussed above involves providing guard tags which are stored in a memory system in association with blocks of one or more memory locations. A tag check can be performed (e.g. when a tag-guarded memory access operation is requested) based on a target address identifying a particular addressed location in the memory system, and tag checking circuitry may perform a comparison based on an address tag that is associated with the target address and the guard tag stored in the memory system in association with a block of one or more memory locations which includes the addressed location identified by the target address. The tag checking circuitry may generate an indication of whether a match is detected between the guard tag and the address tag. This indication can be used to control whether the memory access is allowed to succeed or whether subsequent operations can succeed, or could merely be reported while allowing memory accesses to continue as normal. Hence, in response to a mismatch being detected in the tag check performed on the guard tag and the address tag, an error response action can be performed.

This can be useful as, for example, a compiler compiling code based on a memory-unsafe language such as C or C++ can, when initialising regions of memory, set the guard tags of blocks of memory which the code is expected to access to particular values, and may associate corresponding address tag values with the target addresses pointing to those blocks. If a memory usage error occurs, and for example the address pointer is used out of scope or extends out of the bounds of the valid range which was initialised, then it may be likely that the guard tag associated with the addressed location may not match the address tag associated with the target address, and then in this case the indication of whether a match is detected can be used to trigger some error handling response or error reporting mechanism. The particular response taken can depend on the particular needs of the software being executed or on the particular micro-architectural implementation of the architecture. Hence, even if the high level language does not have means for performing run time error checks in order to guard against memory access errors, the ISA used for the compiled code may include architectural features for performing such checks.

However, it may be desirable to prevent a particular thread of a process from reusing address tags used by other threads of the process to access data associated with those other threads. While each process typically has its own set of associated page tables specifying permissions information for that process, the threads of a process share the page tables of the process and so the permissions information stored in the page tables associated with a process is common to all threads of that process. The permissions implemented by a memory management unit (MMU) may therefore not be suitable for enforcing protection between threads of the same process.

One example of where it may be desirable to prevent threads of a process accessing data associated with other threads of the process is in the context of browser tabs. To run code on a webpage, such as Javascript code, a browser may implement a virtual machine which translates the code into a form executable by the virtual machine and then executes the code. Even if there are not sufficient resources to implement full process separation by running each browser tab in a separate process, it may be useful to keep browser tabs separate to ensure code associated with one browser tab cannot accidentally or maliciously access data associated with another browser tab.

The present technique provide support for remapping of at least one of the guard tag and address tag involved in a tag check, and basing the tag check on the at least one remapped tag. In this way, a different mapping between tags can be used for threads that are to be kept separate from each other. Even if a thread were to try to reuse a target address and address tag combination used by a different thread that led to a match between the address tag and the guard tag associated the target address, the at least one of the guard tag and address tag could be remapped differently so that the tag check detected a mismatch when the tag was reused (even though the two threads are accessing the same physical address in memory). Therefore, a thread attempting to access data belonging to another thread may be identified and an appropriate action taken (e.g. the two threads could correspond to browser tabs as in the example above).

This approach enables sandboxing of portions of code without the need to use a different process for each sandbox, and avoiding the overhead of having to rearrange the guard tags in memory or maintain a separate set of page tables for each sandbox. Such an approach also allows access rights to memory to be controlled on a thread-by-thread basis at a granularity finer than the page-level granularity used by the page tables, which typically refer to regions of 4 KB, 16 KB, or 64 KB for example, as different guard tag values could be assigned to different portions of a single page and subject to different mappings between guard/address tags for different threads.

According to the techniques described herein, an apparatus may comprise tag checking circuitry that operates in response to a target address. The target address may identify a target memory location which may be a location in a memory system for which access is sought or otherwise a location in the memory system for which a tag check is to be carried out (for example, the target address may identify a memory location which it is anticipated is likely to be accessed by future memory accesses—it is not essential for the tag check to be performed at the same time as the memory access itself). The memory system may comprise main memory as well as a cache structure. In one example, the memory system includes main memory, a level 1 instruction cache, a level 1 data cache, and a shared level 2 cache. It will be appreciated that other cache hierarchies are possible.

As discussed above, guard tags may be stored in association with a blocks of one or more memory locations. In this way, memory locations may be part of a block with a guard tag that is used to constrain access to that block in dependence on whether an appropriate address tag for accessing that block is provided.

In some embodiments, the blocks of memory locations which have corresponding guard tags may each comprise a single memory location. In this case, each individual memory location may have a different guard tag, which can provide fine granularity of setting the guard tags so that a greater range of memory errors can be detected.

However, in practice, the overhead of setting individual guard tags for each addressed location may be too high, and it can be more efficient to associate each guard tag with a block of multiple memory locations. In this case, several adjacent memory locations may share the same guard tag, which can be enough for detecting common forms of memory-related error.

The guard tag which is associated with a given block of memory locations can be stored at any other memory location within the memory system. The particular way in which the location of the guard tags in the memory system is selected may vary significantly from implementation to implementation or at run time. In some examples, the location storing the guard tags could be architecturally accessible by the processing circuitry, e.g., the guard tag storage location may be a location mapped to part of the same address space as the addressed location. In this case, the mapping between the addressed location itself and the address of the corresponding tag storage location could be fixed or hardwired, or could be variable, e.g. tracked in a tracking table maintained by the memory access circuitry or in a translation lookaside buffer. Alternatively, other implementations may store the guard tag associated with a given addressed location in a further storage location which is not architecturally accessible to the processing circuitry, e.g. in additional storage provided in the micro-architecture which is not mapped to the address space which can be addressed by instructions executed by the processing circuitry. In this case, the memory access circuitry may determine, based on the address of the addressed location, the particular internal address used to refer to the corresponding tag storage location, and trigger any additional memory access needed to read the tag data from the tag storage location. Regardless of whether or not the tag storage location is architecturally accessible to the processing circuitry, tag values could also be cached within a cache for faster access, either within the same cache used for data values, or in a dedicated tag cache.

In some cases, the guard tags may be relatively small, for example, 4 or 8 bits, and so multiple guard tags each associated with a different block of memory locations may fit within the same memory location.

The address tag can be associated with the target address in different ways. In some cases, the address tag could be specified separately from the target address, e.g. using a separate register specified by the memory access instruction which triggers the memory access operation and guard tag check. However, in other examples, the address tag may be determined as a function of one or more selected bits of the target address. That is, the address tag may comprise information derived from a portion of the target address itself. Often, while an instruction set architecture may support addresses with a certain number of bits (e.g. 64 bits), a given hardware device may not in practice need so much memory capacity that it would use all the possible addresses which can be represented using that number of bits. For example, with current trends in device usage there is not yet any need to provide $2^{64}$ individual addressable locations. Therefore, often some bits of the memory addresses may effectively be unused and may either always have the same value, or be set as a sign extension of the most significant "real" address bit (so that the unused portion is set to all 0s or all 1s). This unused portion can therefore be reused to represent the address tag or a value for deriving the address tag, to avoid needing to access a separate register in order to obtain the address tag, and also to make it easier to track the correspondence between the addresses and the corresponding address tags as the address tag may by definition be transported along with the address whenever the address is manipulated or moves between registers.

In embodiments which use a portion of the target address to determine the address tag, note that this address tag is different to a tag portion of the target address which may be used by caches to determine whether the information from the addressed location identified by the target address is stored within the cache. Many caching schemes may store a tag portion of the address of a cached piece of data alongside that data within the cache, so that on searching the cache for a given address, part of the address can be compared with the tags stored alongside the cached data in order to determine whether the cached data actually corresponds to the required address. However, in this case the tag portion of the address, which is compared with the tag in the cache, would be part of the portion of the address which actually identifies the particular addressed location for which the data is required, i.e., changing the cache tag portion of an address would by definition result in the address pointing to a different addressed location within the memory system. In contrast, with the address tag used for a tag-guarded memory operation, the memory access circuitry may select the addressed location for which data is required independent of the address tag. That is, even if the address tag has different values, the addressed location referenced by the target address may still be the same, as the selection of the addressed location may depend only on other portions of the target address. This gives the freedom for compilers to set the address tags associated with particular addresses to any value (e.g. the randomly selected values discussed above) to match the corresponding guard tag values which have been allocated to the relevant blocks of data in the memory system.

In accordance with the techniques described herein, the apparatus may also comprise tag mapping circuitry to store mapping information indicative of a mapping between guard tag values and corresponding address tag values. By virtue of this mapping information, the tag mapping storage circuitry is therefore able to indicate which address tag values will lead to a match when performing the tag check for a particular guard tag value. In typical tag-guarded memory systems, the tag check would merely check whether the address tag provided was the same as the guard tag. However, by storing mapping information in this way, it is possible to create more complicated relations between guard tag values and their corresponding address tag values, e.g., varying the mapping based on the thread from which the request originated.

The mapping information may comprise a plurality of fields in which remapped tag values are stored for the value of the at least one of the guard tag and address tag with they are associated. Alternatively, or additionally, the mapping information may comprise some other form of relation between tag values such as a mathematical function that allows a remapped tag value to be derived from the value of the tag to be remapped. For example, the mapping information could comprise a mapping key value which is hashed with the input tag value of the guard/address tag to be remapped, where the hash of the input tag value and the mapping key value provides the remapped tag value to be used for the tag check. Either way, the mapping storage circuitry enables improved memory security since an address tag used by a given thread for accessing a particular memory location may not lead to a match when comparing the same address tag for the same memory location but used by a different thread for which the mapping information has changed. Thus, a malicious or inadvertent attempt to access data belonging to one thread by another can be identified, and if desired, the access can be prevented.

In accordance with the techniques herein, the tag checking circuitry is configured to remap at least one of the guard tag and the address tag based on the mapping information stored by the tag mapping storage circuitry to generate a remapped tag for use in the tag check.

In some examples, the tag checking circuitry is configured to remap the address tag and not remap the guard tag. Such an approach may be faster than remapping the guard tag and may allow a memory access to fetch the guard tag to be performed in parallel with the address tag being remapped. However, in other examples the remapping may be applied to the guard tag and not to the address tag. By remapping the guard tag and comparing the remapped guard tag with the address tag, more flexibility can be achieved regarding the mappings that can be used. For example, the address tag and remapped guard tag may be longer than the guard tag. By increasing the length of the remapped guard tag and address tag, the number of available tag values can be increased thereby allowing further isolation of threads as explained below. In some examples, both the guard tag and the address tag may be remapped.

Having remapped at least one of the guard tag and the address tag, the tag checking circuitry may be configured to perform a tag check based on the remapped tag. In examples where only one of the guard tag and the address tag are remapped, this tag check may involve determining whether the remapped tag and whichever of the guard tag and address tag was not remapped have the same value. In examples in which both the address tag and the guard tag are remapped, the tag check may determine whether the two remapped tags have the same value. Although the examples above describe detecting a match when the tags have the same value, other conditions for a match in tag values could be used such as detecting a match when the address tag falls within a range of allowed values indicated by a remapped guard tag or detecting a match when the one tag has a value derived from the other tags such as by applying an offset to the tag value.

If the tag checking circuitry detects a mismatch in the tag check, this may indicate that a thread is improperly attempting to access data associated with another thread or otherwise indicate a memory error of the sort listed above. Therefore, the tag checking circuitry may perform an error response action in response to detection of the mismatch. In some examples, it may be desired to prevent accesses for which the tag check is failed and so the error response action comprises denying access to the memory location specified by the target address. In some examples however, access to the memory location specified by the target address may be permitted and the mismatch being detected logged. This may be helpful to indicate to a programmer code that is functioning incorrectly or otherwise as part of a process of identifying malicious or malfunctioning code in a system where it is not necessary to restrict access. This may improve performance since the access may be allowed to proceed while the tag check is performed.

By storing mapping information and basing the tag check on the remapped tag in this way, the present technique is able to effectively sandbox portions of code and implement memory protection in an efficient manner.

As discussed above, either the address tag or the guard tag may be remapped to produce a remapped tag for use in the tag check. In some examples, both the address tag and the guard tag may be remapped to produce remapped tags that are compared against each other in the tag check. This may make it harder for an attacker to reverse engineer the mapping between guard tags and address tags by comparing the pairs of address tags and guard tags that lead to a match in the tag check.

In some examples, where the guard tag is remapped, the address tag is longer than the guard tag and the remapped guard tag is longer than the guard tag. For example, a 4-bit guard tag may be stored in the memory system. If a 4-bit address tag were to be used, this provides 16 possible address tag values. However, if an 8-bit address tag were to be used for the address tag, then there are 256 possible address tag values. The 4-bit guard tag could then be mapped to an 8-bit remapped guard tag for comparison with the 8-bit address tag. This approach may provide improved sandboxing between threads of the same process since different sets of non-overlapping address tags can be defined for different threads. For example, for a first thread, a first set of 16 address tag values may be mapped to the 16 guard tag values, and for a second thread, a second set of 16 different address tag values may be mapped to the 16 guard tag values. Therefore, if an address tag associated with the first thread were to be used by the second thread, the mapping information for the second thread would indicate that the address tag value is not mapped to any guard tag. As such, the tag check may be more likely to detect and be able to handle such a situation. This reduces the chance of detecting a match when comparing an address tag used validly be one thread is used by another thread. In general, this approach may allow increased memory security by providing greater isolation of different threads than is possible when the address tag has the same number of bits as the guard tag.

Although the address tag and remapped guard tag can be longer than the guard tag in this way, in some examples in which the address tag is remapped, the guard tag and the remapped address tag may be longer than the guard tag. Such an approach would benefit from the increased number of possible tag values but may require a longer guard tag to be stored in the memory system. However, in some systems, the space available in a pointer for storing an address tag may be limited and so to benefit from the reduced likelihood of tags inadvertently matching, it may be desirable to store longer guard tags in the memory system and remap the address tags to longer remapped address tags.

Hence, in general when remapping at least one of the address tag/guard tag to form the remapped tag, the remapped tag could be longer (have a greater number of bits) than the original address/guard tag being remapped.

In some examples, the tag checking circuitry may be configured to perform the tag check in response to a memory access request. For example, the memory access request could be a load request to request that data from a location associated with the target address is to be loaded into a register, or an instruction fetch request to request fetching of an instruction associated with the target address, or a store request to request that data is to be written to a particular memory location identified by the target address. The memory access request may have one of a plurality of access types. For example, the memory access request may have one of read, write, and execute access types where the access type indicates the type of operation associated with the target address (read accesses corresponding to load requests, write accesses corresponding to store requests, and execute accesses corresponding to instruction fetch requests). It will be appreciated that other systems may support other types of access and a number of possible sets of access type may be used.

In some examples, the tag mapping information may limit, for a given item of mapping information providing a mapping between a given guard tag value and a given address value, which of the plurality of access types of memory access request are allowed to access a memory location in a block associated with the guard tag having the given guard tag value when the address tag of the memory access request specifies the given address tag value. For example, the item of mapping information may indicate that the block of memory locations associated with a particular guard tag is to be read only. Therefore, when the tag checking circuitry performs the tag check for a target address specifying a memory location in the block of memory locations, even if the tag check based on the address tag and the guard tag detects a match, tag checking circuitry may limit the allowed access to read accesses. If the tag checking circuitry detects a match based on the tag values but the requested access type is not a read access indicated as a permitted access type by the item of mapping information, the tag checking circuitry may determine that the access is not allowed.

By limiting the types of access that are permitted using the mapping information, the apparatus may provide permissions information at a level of granularity of the blocks of memory locations for which separate guard tags are defined. In typical systems, permissions information would only be defined at the page level with a set of permissions to be applied to the entire page. Therefore, this approach may allow more fine-grained permissions to be implemented by setting different guard tag values for different addresses in the same page and associating different permissions with those guard tag values, or by specifying different guard-tag/address-tag mappings for accesses of different types (e.g. read/write/execute). Either way, the mapping information is used to limit what types of access request are allowed to access a block of memory associated with a given guard tag value.

The mapping information be presented in a number of forms. For example, the mapping information may comprise a mathematical relation between address tag values and guard tag values where the address tag value can be determined from the guard tag value or vice versa. Such a mathematical relation may be usable in two directions to determine both the remapped tag value from the value of the at least one of the guard tag and the address tag as well determining the value of the value of the at least one of the guard tag and the address tag from the remapped tag value. Using a mathematical relation in this way may allow tags to be remapped quickly and require less storage space that other techniques. Alternatively, the mathematical relation may only be usable in one direction to determine the remapped tag value but may make it difficult or impossible to infer the value of the at least one of the address tag and guard tag from the remapped tag value so that an attacker cannot reverse engineer a valid address tag even if they know the guard tag for a particular location.

In some examples, the mapping information specifies a plurality of remapped tag value fields storing remapped tag values which can be looked up based on the value of the at least one of the guard tag and the address tag. In such examples, when remapping the at least one of the address tag and the guard tag, the tag checking circuitry may be configured to select one of the plurality of remapped fields based on the value of the at least one of the guard tag and the address tag. In this way, the tag checking circuitry may determine the remapped tag to be used in the tag check based on the remapped tag value specified in the selected remapped tag value field. By storing the mapping information in this way, the mapping information can easily associate any of the possible values of the at least one of the guard tags and address tags with a remapped tag value by setting the remapped tag value field to the desired value. This provides flexibility in the mapping used between tag values and allows tag values to be updated easily. This approach may also allow the same address tag value to be mapped to two or more different guard tag values to provide an address tag that can be used to access more memory locations. Similarly, the same guard tag value could be mapped to two or more different address tag values, which could be used to allow access to a particular block of memory locations using more than one possible address tag values, or provide different address tag values for different types of access to the same memory location. Further information, such as permissions information, could also be stored in association with each item of mapping information by providing a field that could be selected using the value of the at least one of the guard tag and the address tag in a similar manner to the selection of the remapped tag value.

In addition to storing the remapped tag values in the plurality of remapped tag value fields of the mapping information, the fields of mapping information could also be used to store permissions information in association with the remapped tag values. Each field could therefore specify not only the remapped tag value that is to be used in the comparison but also an indication of the types of memory access allowed. For example, for each item of mapping information, one or more bits may be provided to indicate permissions information. This allows the tag checking circuitry to ensure not only that a portion of code executing should have access to a given block of memory locations, but that the portion of code has sufficient access rights for the type of access that is sought. For example, the tag checking circuitry may receive a write access request for a given location. The tag checking circuitry may detect a match when performing the tag comparison. However, the remapped tag value corresponding to the given location may indicate that only read and execute accesses are allowed for that memory location using that address tag. In response to detecting such a mismatch between the requested access type and the permissions information, the tag checking circuitry may take an error response action. The error response action may be the same as the error response action taken in response to detecting a mismatch in the tag comparison or may be a different error response action.

These techniques may be used to enforce write-exclusivity whereby memory locations may be subject to either write accesses or execute accesses but memory locations that can be written to are not used for execution and memory locations storing code that may be executed are not written to. This reduces the chance that an attacker may provide malicious code that is able to be executed.

It will be appreciated that storing permissions information in association with remapped tag values is only one of a number of possible ways of restricting the types of memory accesses that are allowed. In some examples, the tag mapping storage circuitry is configured to store different sets of mapping information corresponding to different access types. For example, in a system making use of read, write, and execute access types, the tag mapping storage may be configured to store a set of mapping information for each of the read, write, and execute access types. When performing the tag check, the tag checking circuitry may be configured to select which set of mapping information to use to generate the remapped tag for use in the tag check based on the access type associated with the memory access request. That is, the tag checking circuitry may select the set of mapping information that corresponds to the type of access requested so that for example, when a read access is requested, the mapping information corresponding to the read access type is used for remapping. In this way, a different set of mapping information can be provided for each of a number of different access types so that, for example, if an address tag that is valid for read access to a given memory location is reused to attempt to write to the same memory location, different mapping information will be used to generate the remapped tag for use in the tag check and so the mapping information for the write access may be such that a mismatch is detected in the tag check. This means that separate read/write/execute rights can effectively be defined for individual sub-portions of a page, which would not be possible with permissions defined by an MMU using page tables for example.

The techniques described herein may be particularly useful for sandboxing different threads of the same process. Processes running on a processor may have an associated set of page tables which allow virtual addresses used by the process to refer to memory locations to be translated into physical addresses that can be used to access the physical memory. These page tables may be used to provide separation between different processes running on the processor. However, such an approach does not provide protection within a process to prevent threads of the process from accessing data associated with other threads of the same process.

Sandboxing or preventing threads of a process from accessing the data of other threads of the same process which consequently share the same set of page tables may be desirable, for example, in the case of browser tabs. A browser may implement a single virtual machine, such as a JavaScript engine to run JavaScript code present in web pages loaded in the different tabs or the browser. Whilst it may be desirable to separate the code running in the different browser tabs, using full process separation with a different set of page tables for each tab may be too resource intensive to implement for each tab. However, each browser tab for example could be implemented in a thread and each thread sandboxed to provide memory protection between the browser tabs in accordance with the techniques described herein.

According to some examples, the mapping information stored in the tag mapping storage circuitry is associated with a particular thread (e.g., a thread running code from one browser tab) executable by the processing circuitry. The mapping information may be indicative of a mapping for use in response to a target address generated by the processing circuitry when executing the particular thread. Thus, the tag checking circuitry may ensure that the set of mapping information associated with the thread being executed is used to generate the remapped tag value for use in the tag check. By providing separate sets of mapping information for the different threads, if a thread attempts to access a memory location it should not access using the address tag it uses for another location which it can access, or attempts to reuse a target address and address tag combination from a different thread, this can be detected and an error response action performed.

It will be recognised that although tabs in a browser are one example of where a process may have multiple threads, sandboxing between threads could be used for a range of possible purposes. Moreover, some low-power or small-footprint devices may not otherwise implement any form of memory management using page tables and by using the techniques described herein to provide separation between threads, such devices may be able to enforce more fine-grained memory protection without the overhead of handling page tables.

In some examples, the tag mapping storage circuitry may comprise storage circuitry to store one set of mapping information at a time. For example, the tag mapping storage circuitry may comprise a register to store a mapping associated with the thread executing on processing circuitry at the time. When the processing circuitry switches to execute a different thread, the apparatus may cause a set of mapping information associated with the thread to be loaded into the register to replace the mapping information associated with the thread that was no longer being executed. By only storing one set of mapping information in the tag mapping storage circuitry at a time, the tag mapping storage circuitry can be simplified. Moreover, since other information (such as register state, control state for controlling how the new thread will be processed, and context identifiers relating to the new thread) will typically be loaded on a context switch, loading the new mapping information at the same may not cause a serious performance issue when switching threads.

Alternatively, the tag mapping storage circuitry may be configured to store a plurality of sets of mapping information, each corresponding to a different thread. The tag checking circuitry may therefore be configured to carry out the tag check based on the mapping information stored in one of a plurality of mapping registers in the tag mapping storage circuitry associated with the thread which triggered the tag check. By storing mapping information in the tag mapping storage circuitry for more than one thread, the apparatus can more quickly transition between executing different threads as a new set of mapping information does not need to be loaded on a context switch.

For example, a simultaneous-multi-threaded (SMT) processor may store mapping information for each thread alongside architectural state stored for the threads. In an SMT processor, multiple threads can execute at once with instructions being tagged with the thread identifier (ID) of the corresponding thread. An SMT core typically has multiple sets of registers to store architectural state for multiple threads at once, with the appropriate set of registers referenced for each instruction based on the thread ID of the instruction. The pipeline of the SMT processor is therefore able to interleave processing related to a plurality of threads and may have instructions 'in-flight' for multiple threads at the same time. As such, in addition to the registers storing architectural state, the SMT may also provide mapping registers for the different threads supported in hardware. The tag check may then be performed based on the mapping information stored in a register selected using the thread ID of the instructing triggering the tag check.

In some examples, the apparatus provides a facility to update or generate mapping information. Such tag mapping setting circuitry may be used to change some or all of the mappings between the at least one of the guard tag values and the address tag values, and the remapped tag values, or may be used to produce an entirely new set of mappings. The tag mapping setting circuitry may be responsive to a plurality of types of request for new or updated sets of mapping information to generate or update the mapping information in a manner indicated by the request. An ISA defining the instructions supported by processing circuitry may contain instructions to allow a programmer to specify that mapping information should be generated or updated or the requests may be implemented as a micro-architectural feature to implement the intention of a programmer specified at higher level. In some examples, the ISA does not include a dedicated instruction for setting the mappings and the mapping register may instead be treated as a control register which may be updated using a control register setting instruction specifying the value to be written to the register. In other examples, dedicated mapping setting instructions could be supported which cause the hardware to generate the values to be specified in the mapping information without the software needing to provide the exact values to be set in the mapping information as an operand of the mapping setting instruction. Examples of the types of request and the response of the tag mapping setting circuitry will now be discussed.

In some examples, the tag mapping setting circuitry is configured to generate a new set of mapping information in response to a request for such a new mapping by 'shuffling' the available remapped tag values. That is, the tag mapping setting circuitry may set the tag mapping storage circuitry to indicate a new set of mapping information that indicates that each value or the at least one of the guard tag and the address tag is associated with a different remapped tag value. By associating each value of the at least one of the guard tag and the address tag with a different remapped tag value, the chance that misuse of an address tag is not detected is reduced. Particularly, this approach ensures that two values of the at least one of the guard tag and the address tag are not mapped to the same remapped tag value. In turn, this reduces the chance that a match will be detected when a pointer is used to access a region of memory for which it was not intended. If two guard tag values were mapped to the same remapped tag value for example, if the address tag were validly generated to access a block associated with the first of these guard tag value, a match may nonetheless be detected if the address tag were used to access a block associated with the second of the guard tag values even if access to these locations should have triggered the error handling response to signal a memory usage error.

It may be desirable when updating a set of mapping information to be able to specify one or more values of the remapped tags that are not to be used. This may be the case where certain remapped tag values are being reserved for a particular purpose (e.g., because used for a previously allocated memory region for which no tag aliasing is desired) and it is desired that no values of the at least one of the address tag and the guard tag are mapped to those remapped tag values. This may be indicated by a tag mapping update request which specifies the one or more excluded tag values that are to be excluded from selection as remapped tag values. In response to this request the tag mapping setting circuitry may indicate a new set of mapping information that indicates that each value of the one of the guard tag and the address tag is associated with a remapped tag value other than the one or more excluded tag values. It will be appreciated that if the new set of mapping information is to be generated with certain tag values excluded and it is desired that each tag value is mapped to a different remapped tag value, more remapped tag values should be available than tag values to be remapped, for example, by using a longer remapped tag.

In some examples, the tag mapping setting circuitry is responsive to a request for a new mapping that indicates that certain memory locations are not to be accessed regardless of the address tag provided. For example, it may be determined that a particular thread associated with the set of mapping information should not be able to access certain memory locations regardless of the address tag provided in association with the request to access those memory locations. To implement this behaviour, the apparatus may comprise tag mapping setting circuitry configured to set, in response to a tag mapping update request which specifies one or more excluded tag values, the tag mapping storage circuitry to indicate a new set of mapping information that indicates that a memory access to the target address is not permitted when the tag check identifies that at least one of the guard tag and the address tag has one of said one or more excluded tag values. The mapping information could indicate that these memory locations are not to be accessed in a number of ways. For example, the set of mapping information may be set such that one or more tag values associated with the prohibited memory locations have no corresponding tag value that will lead to a match in the tag check. This could be achieved by setting all of the fields in the mapping information to values other than the excluded tag values. Alternatively, or additionally the mapping information may comprise permissions information which indicates that when using that set of mapping information, no forms of access to the specified memory locations is allowed.

In some examples, the tag mapping setting circuitry provides a facility to 'pin' one or more existing tag mappings when performing a tag mapping update. For example, it may be desirable to ensure that mappings that are still in use are maintained and not overwritten when other mappings in the same set of mapping information are updated. The tag mapping setting circuitry may therefore be configured to set, in response to a tag mapping update request which specifies one or more existing tag mappings that are to be excluded from the update, the tag mapping storage circuitry to update tag mappings other than the one or more existing tag mappings. Thus, an updated set of mapping information can be generated for storage in the tag mapping storage circuitry while leaving the specified existing tag mappings unchanged. In some cases, when performing such an update, the tag mapping setting circuitry is configured to avoid mapping the corresponding tag values already associated with 'pinned' tag values with tag values not marked as 'pinned'. For example, if certain guard tag values were 'pinned', in addition to not updating the mappings for the 'pinned' guard tag values, the tag mapping setting circuitry may avoid associating any 'non-pinned' guard tag values with the address tag values associated with the 'pinned' guard tag values. It will be appreciated that this could be carried out similarly where address tag values were 'pinned'.

In some examples, the apparatus comprises tag mapping setting circuitry configured to set, in response to a match-all tag mapping update request, the tag mapping storage circuitry to indicate a new set of mapping information that indicates that all guard tag values are to be mapped to the same address tag value. By doing this, a single address tag value may be used to access a memory location associated with any of the guard tags. In some cases, it may be beneficial to provide match-all functionality temporarily so that it can be ensured that when using the one address tag value to which all of the guard tag values are mapped, a mismatch will not be detected in the tag check. This may be useful to provide support for legacy code which does not support the use of tags.

As described above, in response to detecting a mismatch in the tag check, an error response action may be performed. Additionally, an error response action (which may be the same or a different error response action) may performed in response to detecting that an attempted access for which an access type requested is not indicated as allowable by permissions information. The error response action may involve one or more of a number of possible actions. The error response action may involve denying access to the memory location specified by the target address. Denying access to the requested memory location if the tag check files may improve memory security. However, the tag check takes some time to perform, due to needing to fetch the guard tag from memory, and delaying the actual memory access until the tag check has passed may incur an unacceptable performance cost for some implementations. As the tag check may sometimes be used to identify memory errors in code which may not be a significant security problem in themselves, but may provide a risk that attackers may exploit in future, it may be enough simply to provide an indication of the mismatch while still allowing the access to proceed. This can improve performance. The error response action may therefore involve placing an indication that the tag check detected a mismatch in a status register, recording an entry in an error report, or otherwise signalling a fault. The error response action may indicate that a mismatch was detected as well as an address of a location at which the instruction that led to the mismatch is stored and/or the location for which access was sought. In some examples, the apparatus is operable in a plurality of modes with different error response actions performed in different modes. For example, the apparatus may be operable in an imprecise mode in which accesses are allowed to proceed despite a mismatch being detected and a precise mode in which access to the memory location specified by the target address is denied in response to detecting a mismatch. It will be appreciated that there are a number of possible error response actions that could be carried out in response to detecting a mismatch and more than one such error response action may be carried out in response to detection of a mismatch.

Figure 1:
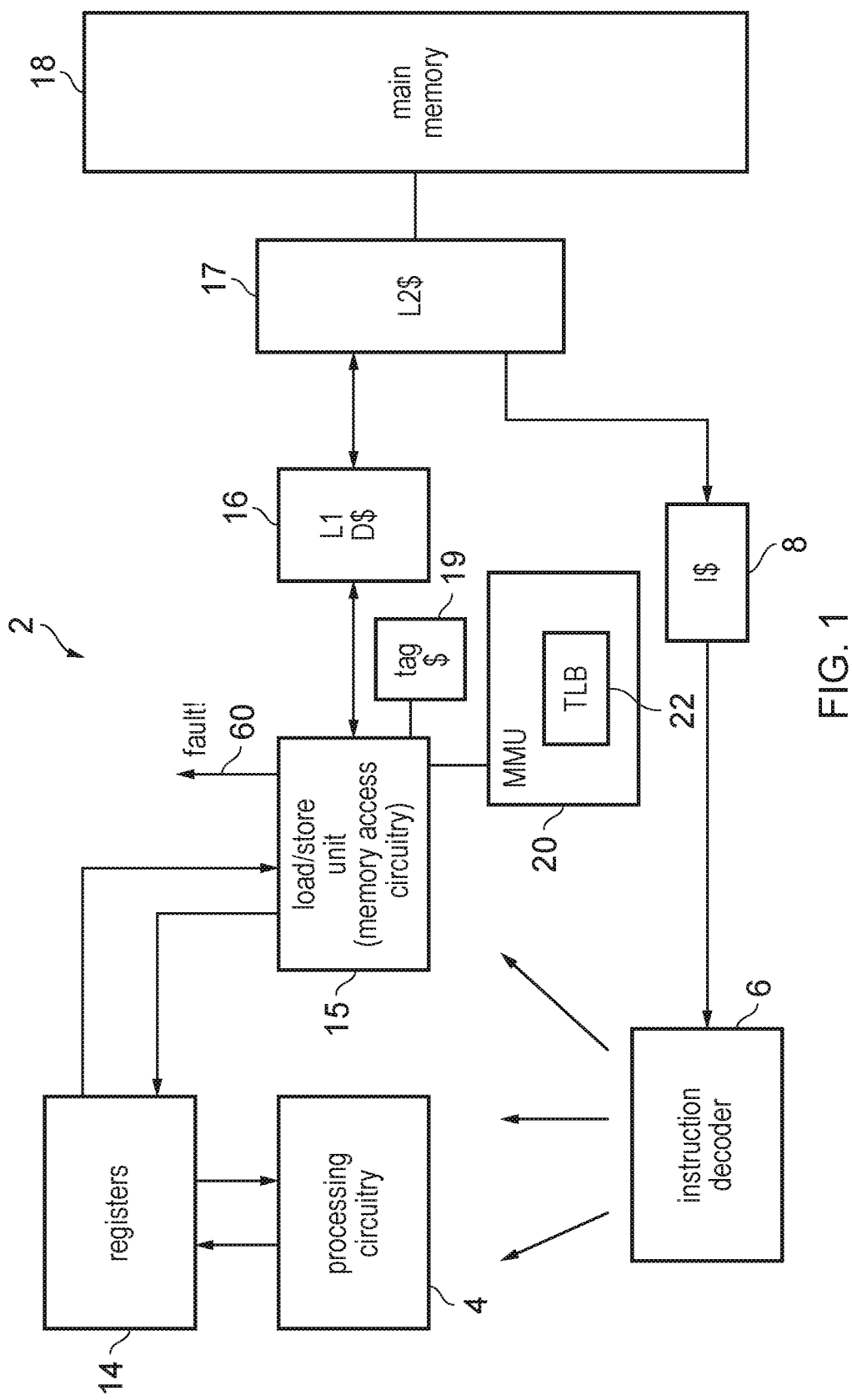

FIG. 1 schematically illustrates an example of a data processing apparatus 2. It will be appreciated that this is simply a high level representation of a subset of components of the apparatus and the apparatus may include many other components not illustrated. The apparatus 2 comprises processing circuitry 4 for performing data processing in response to instructions decoded by an instruction decoder 6. The instruction decoder 6 decodes instructions fetched from an instruction cache 8 to generate control signals for controlling the processing circuitry 4 to perform corresponding processing operations represented by the instructions. The processing circuitry 4 may include one or more execution units for performing operations on values stored in registers 14 to generate result values to be written back to the registers. For example the execution units could include an arithmetic/logic unit (ALU) for executing arithmetic operations or logical operations, a floating-point unit for executing operations using floating-point operands and/or a vector processing unit for performing vector operations on operands including multiple independent data elements. The processing circuitry also includes a memory access unit (or load/store unit) 15 for controlling transfer of data between the registers 14 and the memory system. In this example, the memory system includes the instruction cache 8, a level 1 data cache 16, a level 2 cache 17 shared between data and instructions, and main memory 18. It will be appreciated that other cache hierarchies are also possible—this is just one example. A memory management unit (MMU) 20 is provided for providing address translation functionality to support memory accesses triggered by the load/store unit 15. The MMU has a translation lookaside buffer (TLB) 22 for caching a subset of entries from page table stored in the memory system 16, 17, 18. Each page table entry may provide an address translation mapping for a corresponding page of addresses and may also specify access control parameters, such as access permissions specifying whether the page is a read only region or is both readable and writable, or access permissions specifying which privilege levels can access the page.

Figure 2:
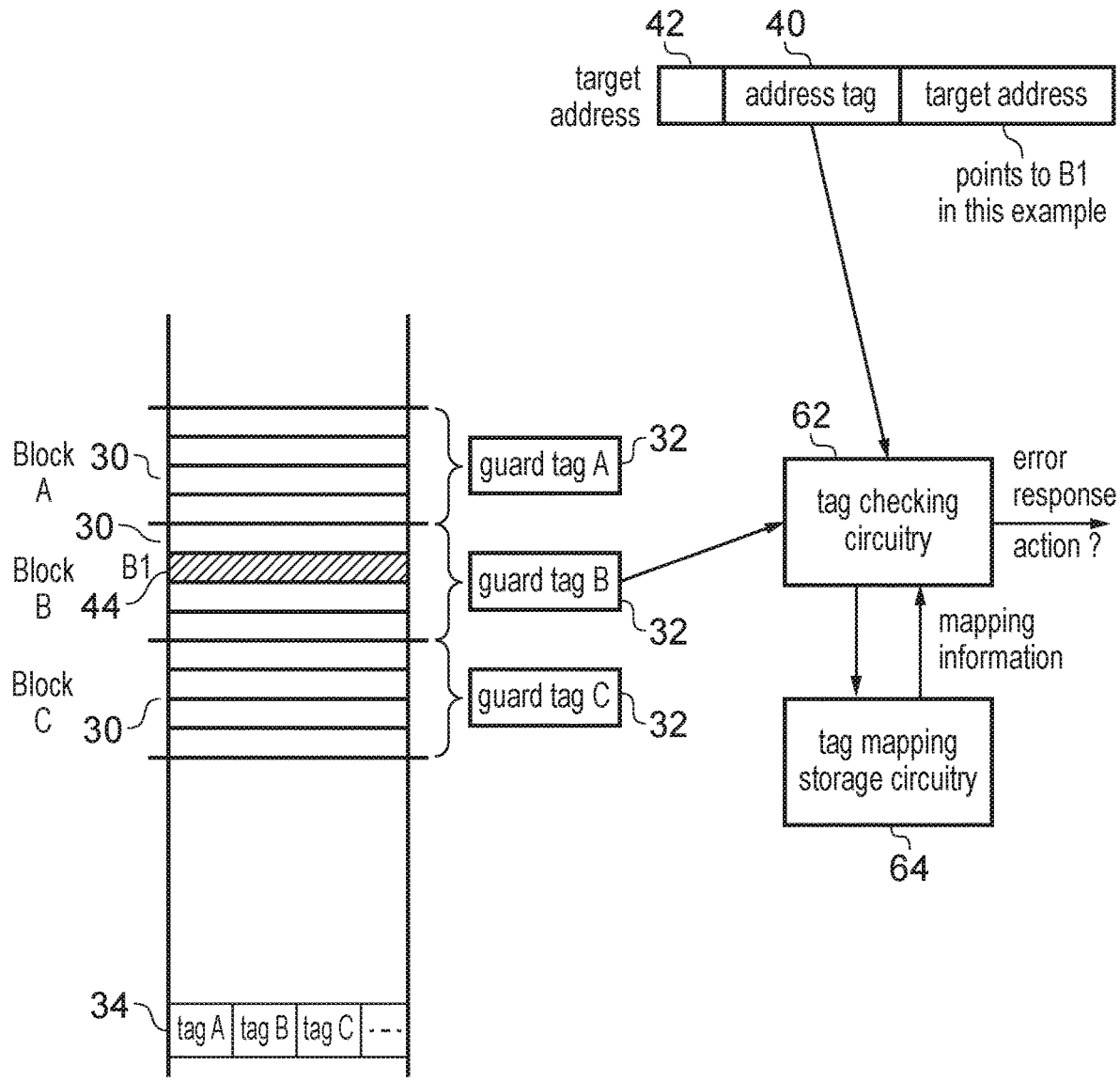
FIG. 2 shows an example tag check involving a comparison based on a guard tag and an address tag.

FIG. 2 shows an example tag check based on comparing a guard tag and an address tag. The physical address space used to refer to memory locations within the memory system may be logically partitioned into a number of blocks 30 each comprising a certain number of addressable locations. For conciseness, in the example of FIG. 2, each block 30 comprises four memory locations, but other block sizes could be used as well. Each block 30 is associated with a corresponding guard tag 32. The guard tags associated with a certain number of blocks 30 can be gathered together and stored either within a different architecturally accessible memory location 34 within the same physical address space, or within additional storage locations provided in main memory 18 which are not architecturally accessible (not mapped to the same physical address space). The use of separate non-architecturally accessible storage may in some cases be preferred to avoid using up space in the data caches 16, 17 for caching guard tag values, which could impact on the performance of the regular code and could make coherency management more complex. An additional tag cache 19 (shown in FIG. 1) could be provided in the micro architecture for caching tag values for the non-architecturally accessible storage, for faster access than if the tags had to be accessed from main memory 18. The particular mapping of which tag storage locations 34 correspond to each block 30 may be controlled by the load/store unit 15 and could be hardwired or could be programmable. While in FIG. 2 each tag 32 is associated with a block of physical addresses, it would also be possible to provide guard tags 32 associated with virtual memory locations in a virtual memory address space, but this may require some additional address translations on each memory access. Hence, by associating the guard tag 32 with physical memory locations this can improve performance. In general, it is a choice for the particular micro architectural implementation exactly how the guard tags 32 are associated with corresponding blocks 30 of the physical address space. In general, all that is required is that the guard tag 32 associated with a given block of memory can be accessed and compared.

Hence, when a tag check is required, a comparison is performed based on an address tag 40 (which is associated with the target address 42 identifying the addressed location 44 to be accessed) and the guard tag 32 which is associated with the block of memory locations 30 which includes the addressed location 44. For example, in FIG. 2, the target address 42 points to a certain location B1 in memory, marked 44 in the address space of FIG. 2. Therefore, the comparison is based on the guard tag B which is associated with the block of locations B including location B1 and the address tag 40 associated with a target address 42. The address tag 40 may be determined as a function of selected bits of the target address itself. In particular, the address tag may be determined from bits within a portion of the target address which is unused for indicating the specific memory location which is to be selected as the addressed location 44. For example, in some architectures, the top portion of bits of the target address may always have a certain fixed value such as a sign extension (all 0s or all 1s) and so an address can be tagged with the address tag 40 by overwriting these unused bits with an arbitrary tag value. The particular tag value can be selected by a programmer or compiler, or can be randomly selected. The address tag and the guard tag 32 can be a relatively small number of bits, e.g., four bits and so need not occupy much space within the memory and within the target address.

The tag check may be performed in response to a request to access a given memory location to determine whether that access is allowed or not. In some implementations, tag checks may be performed for all memory accesses. However, it may be preferred to provide a configuration option for software to select whether or not tag checking is performed. In this case, when tag checking is enabled by configuration information stored in a control register, memory accesses may be treated as tag-guarded memory accesses and a tag check may be performed for the target address of each memory access, but when tag checking is disabled by the configuration information, then the memory access may be performed without performing a tag check. Also, some implementations may support the ability to define subsets of memory accesses as requiring tag checking and other memory accesses as not requiring tag checking (e.g. separate tag-checking and non-checking memory access instructions could be supported to indicate whether, if tag checking is enabled, the memory access should be treated as a tag-guarded memory access for which a tag check is to be performed on the target address).

The memory access circuitry 15 may additionally or alternatively support performing a tag check in response to a dedicated tag check instruction which specifies a target address for which a tag check is required without triggering a memory access.

The memory access circuitry 15 comprises tag checking circuitry 62 and tag mapping storage circuitry 64. The tag mapping storage circuitry 64 is configured to store mapping information indicative of mapping between the values of at least one of the guard tags and the address tags and remapped tag values. The mapping information could provide a mapping between guard tags and remapped guard tag values, between address tags and remapped address tag values, or could provide mapping information for both guard tags and address tags. The tag checking circuitry 62 is communicatively coupled to the tag mapping storage circuitry 64.

Hence, in response to a target address 42 with an associated address tag 40, using the mapping information, the tag checking circuitry 62 remaps the guard tag 32, the address tag 40 or both to generate a remapped tag on which a tag check is based. Where one of the guard tag 32 and the address tag 40 is remapped to form a remapped tag, the tag checking circuitry 62 compares the remapped tag with the one of the guard tag 32 and the address tag 40 that was not remapped to determine whether they match. Where both the guard tag 32 and the address tag 40 are remapped to produce remapped tag values, the two remapped tag values are compared to determine whether they match. If the tag checking circuitry 62 detects a mismatch in the tag check, the tag checking circuitry 62 performs an error response action such as outputting a fault signal 60 (shown in FIG. 1). It will be appreciated that there are a number of possible error response actions that could be performed depending on the requirements of the system such as updating a status register that indicates whether there was a match or not, or adding an entry to an error report to indicate the address for which the error was detected and/or the instruction address of the instruction which triggered the error.

Figure 3:
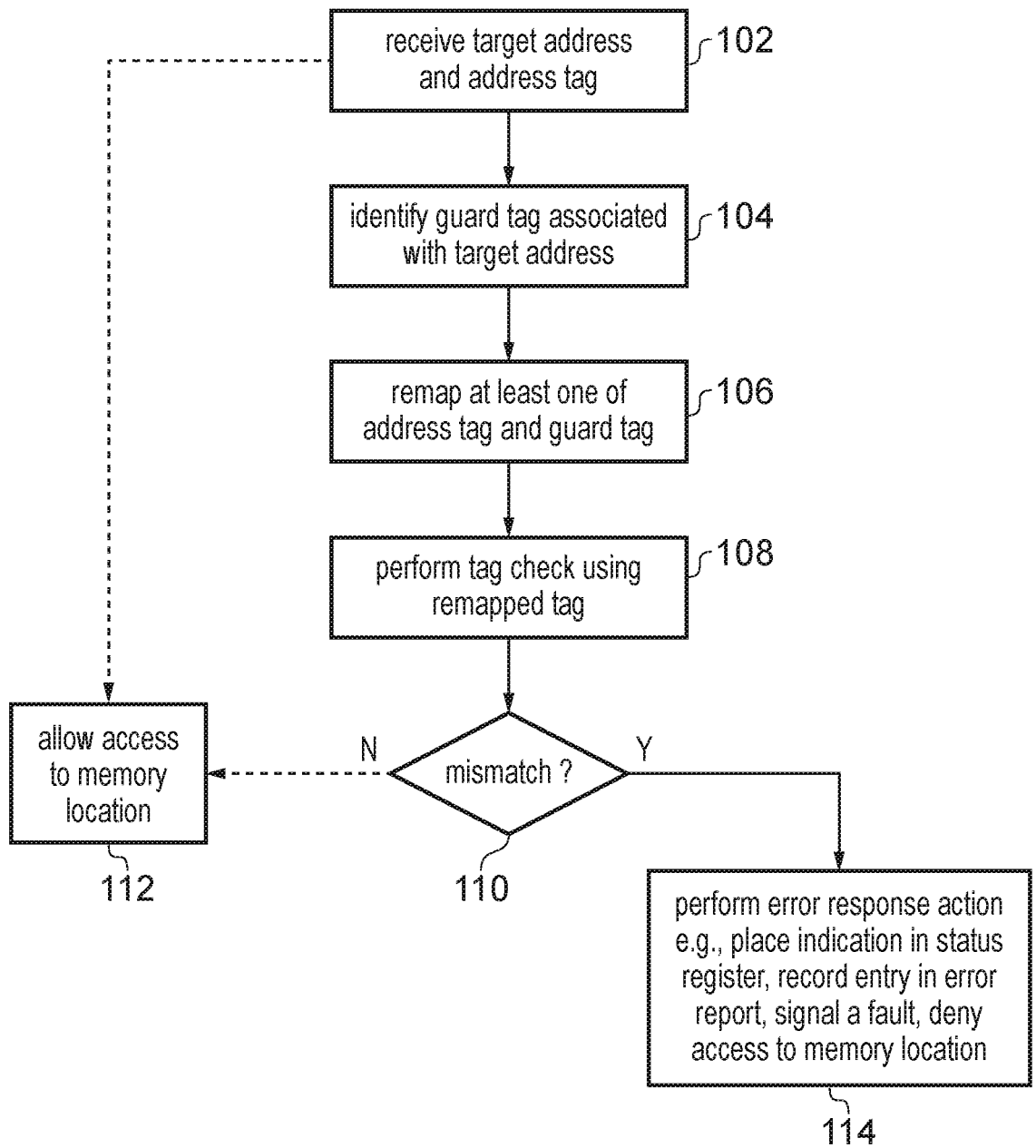
FIG. 3 is a flow diagram showing a method of performing a tag check involving remapping at least one of the address tag and guard tag.

FIG. 3 is a flow diagram showing a method of performing a tag check involving remapping at least one of the address tag and guard tag. At step 102 a target address and address tag are received. In some cases, the address tag may actually be derived from a subset of bits of the target address itself, although in other examples, it could be specified in a separate register. The target address may specify a memory location for which access is sought, the memory location being part of a block of memory locations having an associated guard tag, that guard tag being identified at step 104. At step 106, at least one of the guard tag and the address tag is remapped to produce a remapped tag to be used in the tag check performed in step 108. The tag check compares the remapped tag and the one of the guard tag and the address tag that was not remapped. As illustrated in step 110, if a mismatch is detected in the tag check, an error response action may be performed in step 114 such as placing an indication in a status register, recording an entry in an error report, signalling a fault, or denying access to the memory location identified by the target address. Access to the memory location may be allowed in step 112 in one of two ways as illustrated by the dotted lines in FIG. 3. Access to the memory location may be allowed regardless of the results of the tag check and so may even be permitted before the tag check is carried out. By doing this, performance may be improved since the access may be initiated without having to wait for the guard tag to be returned from memory and the tag check to be performed. Alternatively, access to the memory location may only be allowed once a match has been detected in step 110. Therefore, it can be ensured that only accesses for which an appropriate address tag is provided are allowed to be performed. The memory access circuitry 15 may be configured to carry out only one of these approaches or may be capable of operating in more than one mode and so may, when in different modes, perform the method according to both variations.

Figure 4:
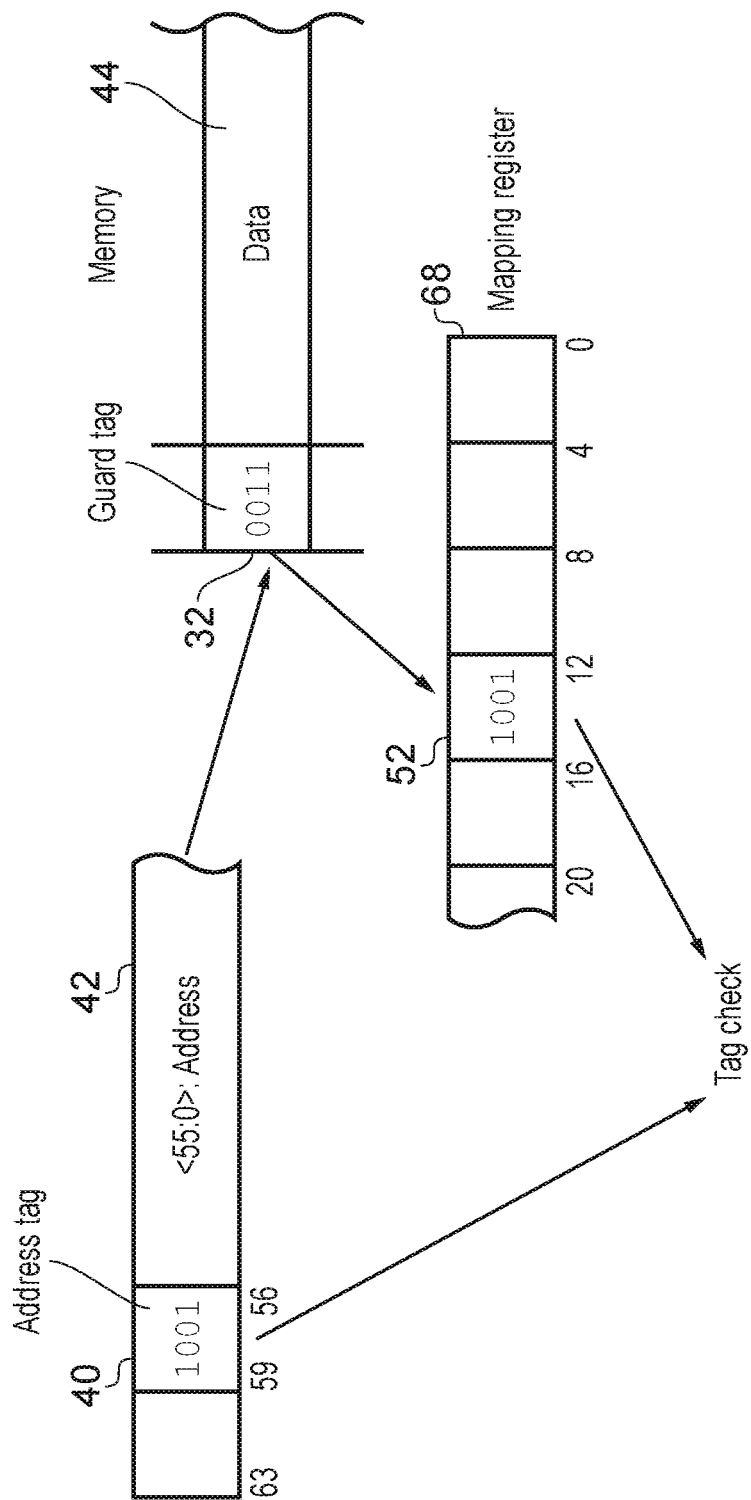
FIG. 4 shows an example tag check in which the guard tag is remapped.

As discussed above, at least one of the guard tag and the address tag are remapped using the mapping information stored in the tag mapping storage circuitry 64. FIG. 4 shows an example tag check in which the guard tag is remapped. FIG. 4 depicts a target address 42 which contains an address tag 40 having a value of 0b1001. The target address 42 specifies a memory location 44 in memory 18 which is associated with a guard tag 32 having a value 0b0011. In this example, the address tag and guard are both four bits in length and so there are 16 possible values for each of the address tag and the guard tag. The tag mapping storage circuitry 64 comprises a mapping register 68 which stores the mapping information. This mapping information is used to map the guard tag 32 to a remapped tag 52. In the example shown in FIG. 4, the mapping information comprises a plurality of sets of bits. Each set of bits represents a field in the mapping information specifying the remapped address tag value for a different guard tag value. The item of mapping information corresponding to the guard tag 32 is identified in the mapping register 68. As depicted in FIG. 4, this corresponds to bits 12 to 15 in mapping register 68 in which the remapped tag value is stored. The tag check can then be performed by comparing the address tag 40 and the remapped tag 52. In this case, the remapped tag 52 has a value of 1001 which is the same as the address tag value and so the tag check detects a match.

Figure 5:
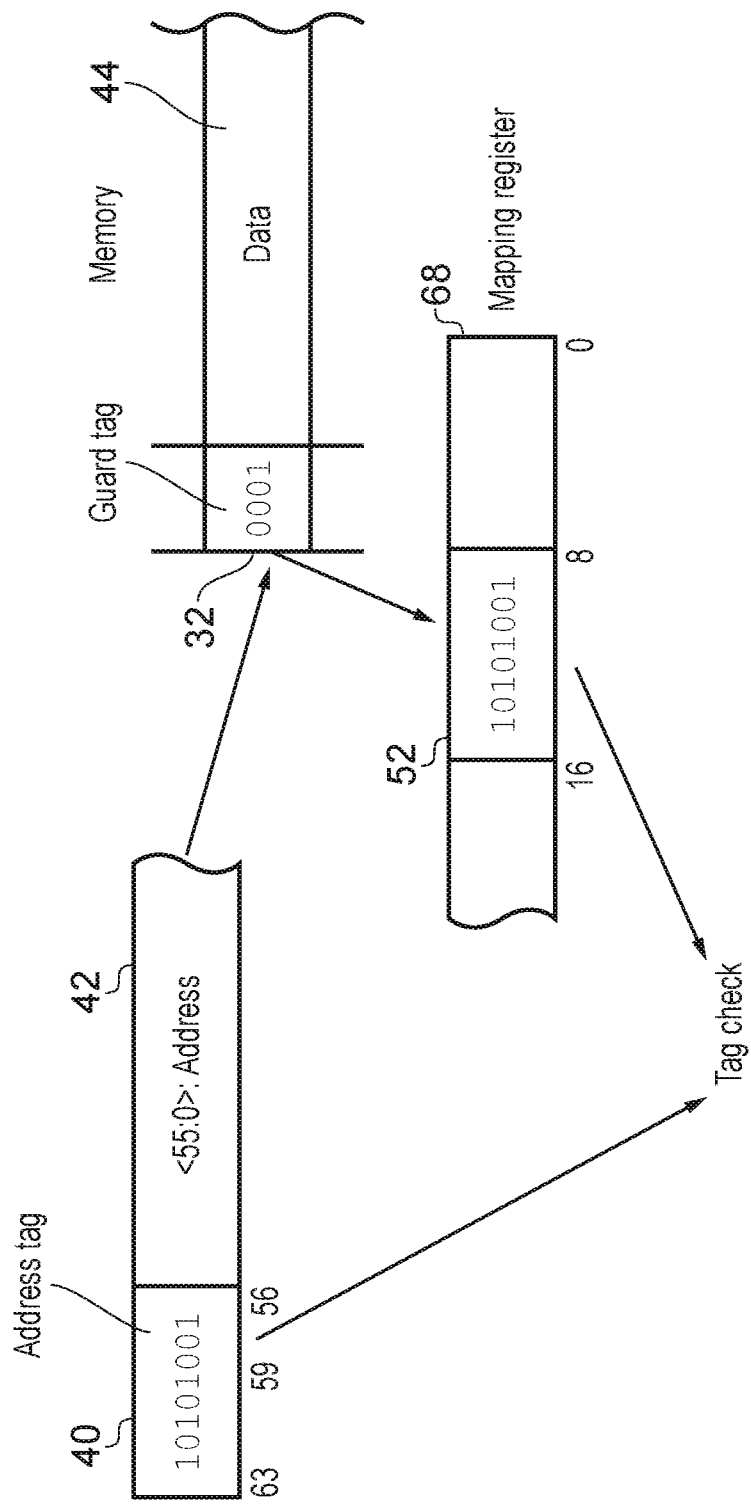
FIG. 5 shows an example tag check in which the remapped guard tag and the address tag are longer than the guard tag.

In the example shown in FIG. 4, the guard tag, the address tag, and the remapped tag 52 are all the same length. However, in some examples the mapping information can map tags of different lengths to each other. FIG. 5 shows an example tag check in which the remapped guard tag and the address tag are longer than the guard tag. In this example, the address tag 40 is eight bits long, having a value of 0b10101001 and the guard tag is four bits long having a value of 0b0001. The mapping information stored in the mapping register 68 maps the 4-bit guard tag 32 to an 8-bit remapped tag 52 for use in the tag check. In this way, many of the benefits of having a longer tag value such as being able to assign distinct sets of address tags in the mapping information for different threads can be achieved without using up more space in memory to store longer guard tags. In some architectures, the top portion of bits of the target address may always have a fixed, certain value. This may occur because while an instruction set architecture may support addresses with a certain number of bits (e.g., 64 bits), a given hardware device may not in practice need so much memory capacity that it would use all the possible addresses which can be represented using that number of bits. For example, with current trends in device usage, there is not yet any need to provide $2^{64}$ individual addressable locations. Therefore, often some bits of the memory addresses may effectively be unused. These bits may therefore be used to store the address tag or a value for deriving the address tag to avoid needing to access a separate register in order to obtain the address tag. The number of unused bits may be sufficient that an 8-bit or longer address tag can be stored without impacting the length of addresses or having to use a separate register to store the address tag. By making use of a longer address tag without using a longer guard tag, memory security may be improved without requiring more space in memory to be devoted to storing guard tags or requiring extra storage for address tags.

Figure 6:
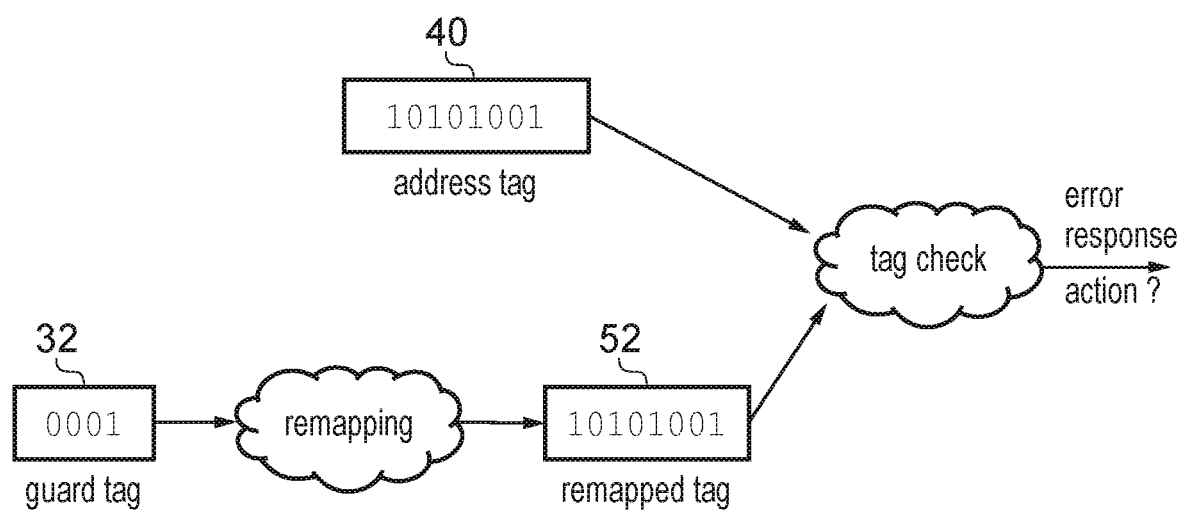
FIG. 6 shows another example tag check in which the remapped guard tag and the address tag are longer than the guard tag.

FIG. 6 shows another example tag check in which the remapped guard tag and the address tag are longer than then guard tag. In the example of FIG. 6, for conciseness, the target address and memory are not shown to illustrate graphically just the tags and their comparison. In this example, the guard tag 32 is remapped to produce a remapped tag 52 that is longer than the guard tag 32 and the same length as the address tag 40. The address tag 40 and the remapped tag 52 are then compared in the tag check. In this example, since the address tag 40 and the remapped tag 52 have the same value, a match is detected in the tag check and no error response action is performed. However, if a mismatch were detected, for example, because the values of the remapped tag 52 and the address tag 40 were different, an error response action would be performed.

Figure 7:
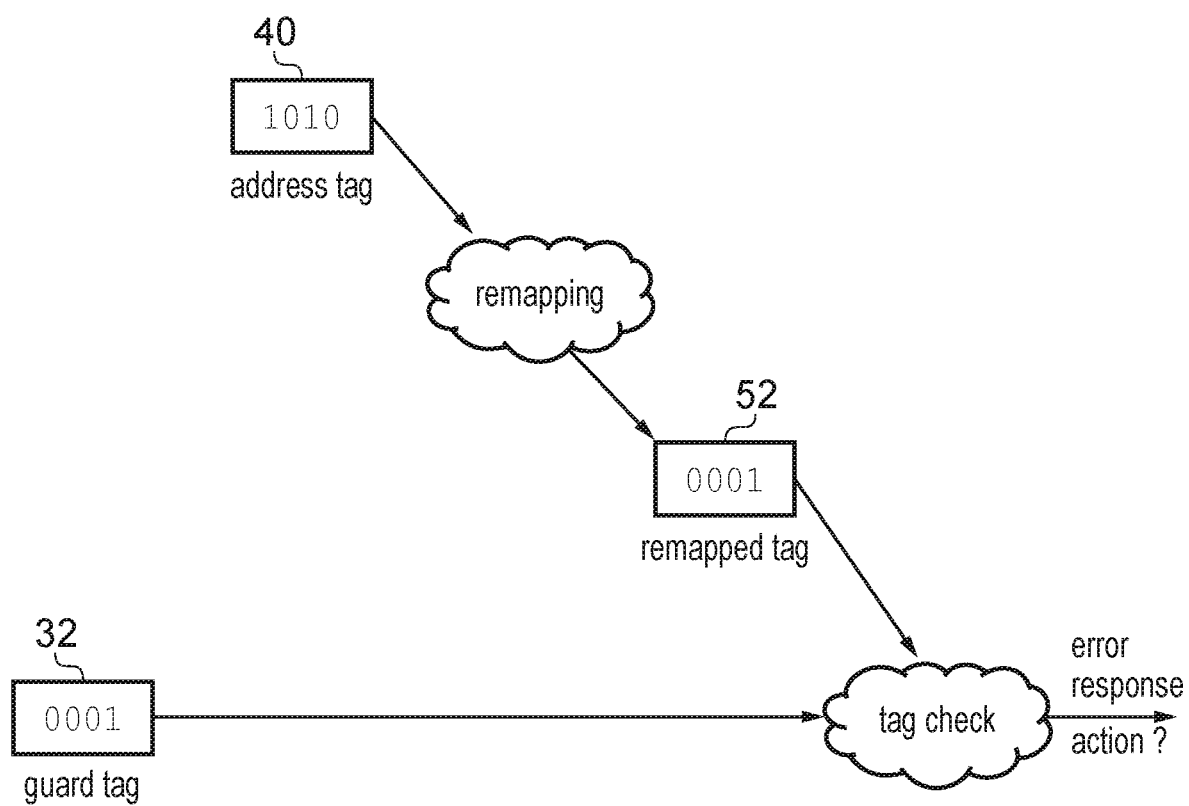
FIG. 7 shows an example tag check in which the address tag is remapped.

In the examples shown in FIGS. 4 to 6, the guard tag has been remapped and the remapped guard tag compared with the address tag. This may provide more flexibility as to how the mappings may be constructed, for example, by making it easier to use a longer address tag. However, as shown in FIG. 7, the address tag 40 may instead subject to the remapping based on mapping information stored in the tag mapping storage circuitry 64 to produce a remapped address tag 52 for comparison with the guard tag 32. This may allow the tag check to be performed more quickly. The guard tag 32 may need to be fetched from the tag cache 19 or from the memory system if the guard tag is not found in the tag cache 19. Therefore, by remapping the address tag 40, the process of remapping may be carried out at least partially in parallel with fetching of the guard tag 32 thereby reducing the time taken from receiving the target address to determining whether there is a match in the tag check. Although not depicted, in some example both the guard tag and the address tag are remapped to produce two remapped tags which are compared against each other in the tag check.

Figure 8:
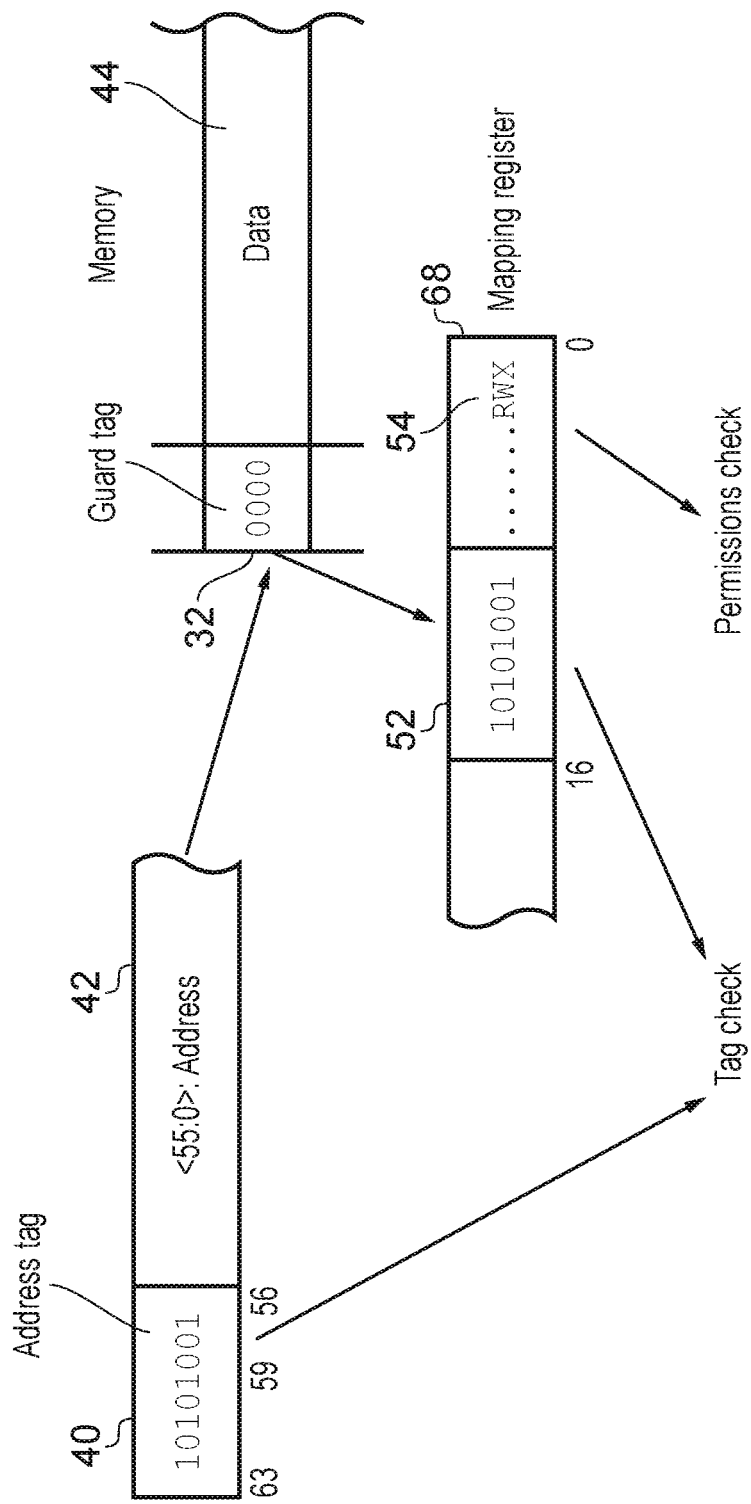
FIG. 8 shows an example tag check involving a check based on permissions information.

FIG. 8 shows an example tag check involving checking permissions. In addition to checking the values of the tags, a permissions check is performed to determine whether the type of access request which has initiated the tag check is an allowed form of access. In the example of FIG. 8, the address tag 40 is an 8-bit address tag which is compared with an 8-bit remapped tag 52 based on a 4-bit guard tag 32. As well as storing the mappings between guard tag values and the remapped tag values for comparison with address tag values, the tag mapping storage circuitry 64 comprises the mapping register 68 storing permissions information for each mapping. As shown in FIG. 8, the item of mapping information associated with the guard tag 32 stores the corresponding remapped tag 52 as well as permissions information 54. In this example, three types of access are supported: read, write, and execute. The permissions information indicates for each item of mapping information which of these types of access is allowed to occur. In other examples, different types of access and corresponding permissions may be supported. Additionally, or alternatively, other information relating to the requested access may be provided with the mapping information such as attributes indicative of a cache policy applicable to the block of memory locations associated with the guard tag identified by the item of mapping information. As well as checking whether the remapped tag value and the address tag value match, a permissions check is performed using the permissions information stored in the mapping register 68 to determine whether a requested access is permitted. If it is determined that the requested access is not permitted then an error response action may be taken, may be the same or a different error response action as the error response action taken when a mismatch is detected between tag values.

By providing permissions information, the allowed types of access can be constrained. This may be used to ensure that a program that is expected to perform only read accesses to certain memory locations does not write to or execute code from those locations, or to identify that the code is doing so and may be faulty. The permissions information may also be used to ensure write-execute exclusivity. It is often desirable for security purposes to ensure that code stored in regions of memory that can be written to cannot be executed in order to prevent malicious or accidental modification of code that will later be executed by the processor. It will be appreciated that the permissions may be implemented at the level of granularity of the blocks of memory locations since different permissions could be associated with each block. Therefore, this approach may provide more fine-grained permissions control than any permissions checking performed by the MMU based on page tables for which any permissions information is applicable to the entire region of memory associated with each page table entry. Any permissions checking based on the tag mapping information may be seen as an additional form of permissions checking performed in addition to the permissions checking based on page tables performed by the MMU (if tag mapping information based permissions checks are performed, this does not prevent the MMU checks also being performed).

Figure 9:
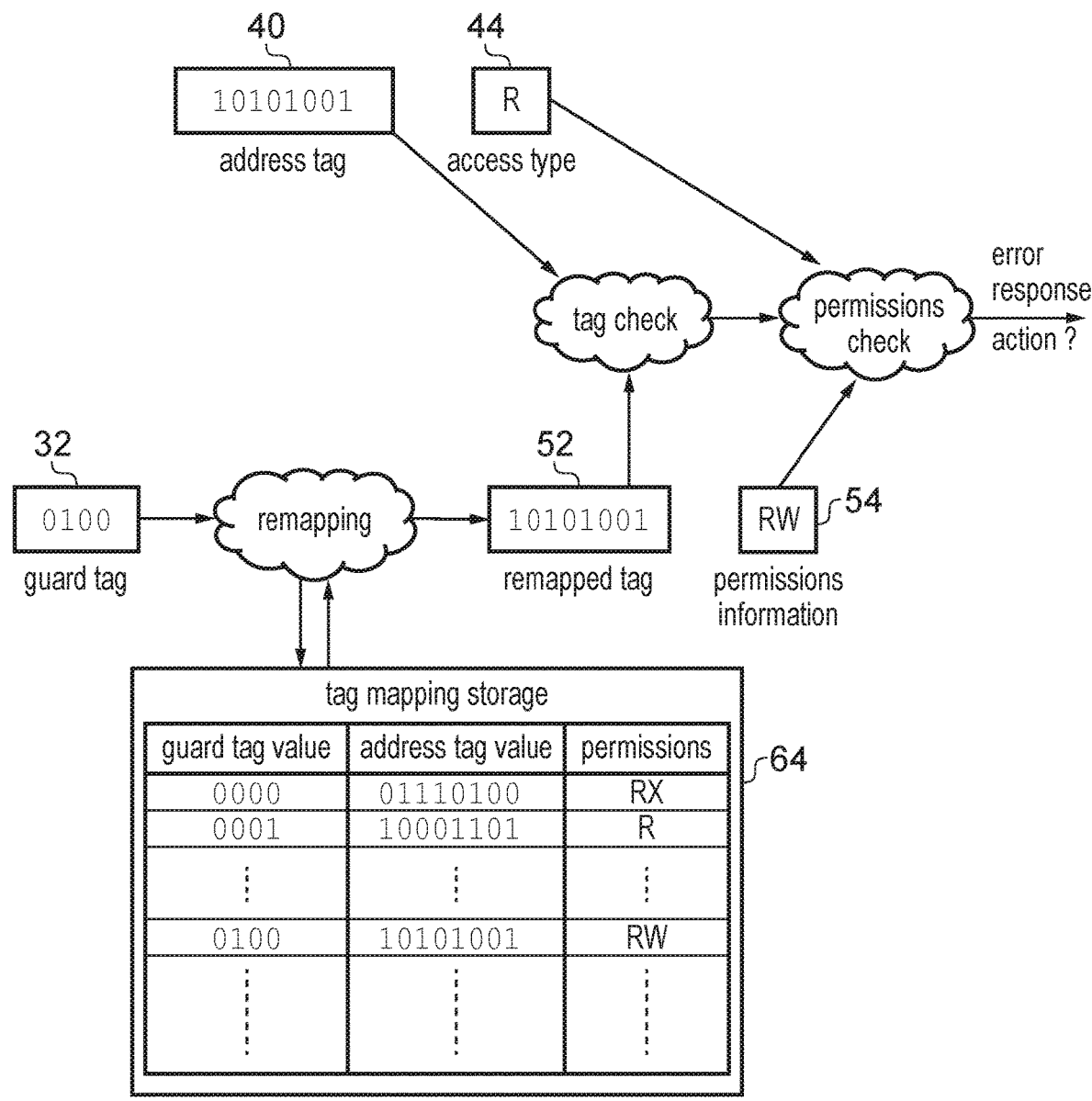
FIG. 9 shows another example tag check involving a check based on permissions information.

FIG. 9 shows another example tag check involving checking permissions information stored with the mapping information. In this example, the memory access circuitry 15 receives a read access request as illustrated by access type 44. The access request specifies a memory location comprised by a block of memory locations 30 associated with guard tag 32. The guard tag 32 is remapped to produce a remapped tag 52 using the mapping information stored by the tag mapping storage circuitry 64. In this example, the tag mapping information specifies a plurality of remapped tag value fields made up of an address tag value that will match the associated guard tag value and permissions information. By structuring the mapping information in this way, the address tag value and permissions information may be easily associated with the appropriate guard tag value and this information easily updated or altered for individual items of mapping information.

To generate the remapped tag 52, guard tag value, 0b0100, is looked up in the mapping information and it can be identified that the corresponding address tag value is 0b10101001 and the allowed types of access to blocks of memory locations associated with that guard tag 52 are read and write. The remapped tag 52 and the address tag 40 are then compared in the tag check and allowed access types indicated by the permission information 54 and the requested access type 44 are compared in a permissions check. In this example, the address tag 40 and the remapped tag 52 match and the requested access type 44 is an allowed access type and so no error response action is performed. If either or both of these checks detected a mismatch, an error response action could be carried out.

Figure 10:
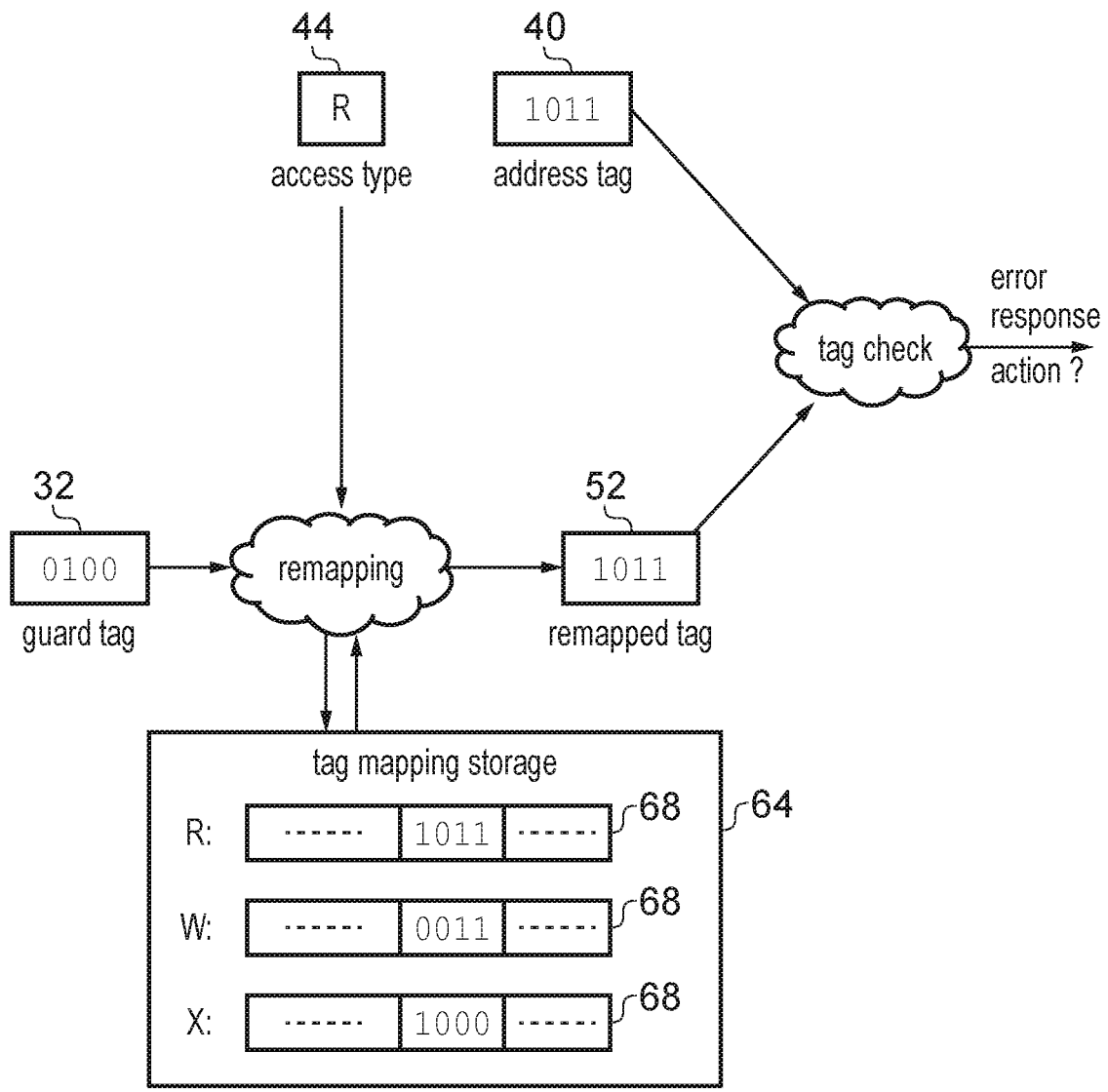
FIG. 10 shows an example tag check involving selecting a set of mapping information to use based on a type of access requested.

FIGS. 8 and 9 show examples in which a field is used to store the permissions information for each item of mapping information. Thus, for the same set of mapping information different items of mapping information (corresponding to different values of the one of the guard/address tag used to index into the mapping information) may have different permissions. However, permissions information may be stored in a number of other ways. For example, a separate set of mapping information may be stored for each of the plurality of possible access types. This approach is illustrated in FIG. 10 which depicts the tag mapping storage circuitry 64 comprising a mapping register 68 for each of the read, write, and execute access types supported by the apparatus. In response to an access request specifying an address tag 40 and an access type 44, the guard tag 32 is remapped based on the appropriate set of mapping information stored in the tag mapping storage circuitry 64. In this case, the access request is a read access request and so guard tag 32 is remapped based on the set of mapping information stored in the mapping register 68 corresponding to the read access type. The set of mapping information for the read access type indicates that the remapped tag value for the guard tag 32 is 0b1011 and so the remapped tag 52 has a value of 0b1011. This remapped tag value 52 is compared with the address tag 40 in the tag check. Since the tag values are the same, no mismatch is detected and so no error response action is carried since it has been determined that an appropriate address tag for performing the requested type of access on the requested target location has been provided. However, if the same address tag 40 having a value of 0b1011 were to be used to try and perform a write access, a different set of mapping information would be used to remap the guard tag 32, which may result in a different remapped tag 52 that did not match the address tag 40. As shown in FIG. 10, if a write access were instead requested, a different mapping register 68 storing different mapping information would be used the guard tag 32 would be remapped to produce a remapped tag 52 with a value of 0b0011. Therefore, the tag check would detect a mismatch between the address tag 40 having a value of 0b1011 and the remapped tag 52 having a value of 0b0011 and so an error response action would be performed. In this way, a memory error occurring due to valid address tag being reused for a different type of access that that for which it was intended can be identified, prevented and/or logged.

Figure 11:
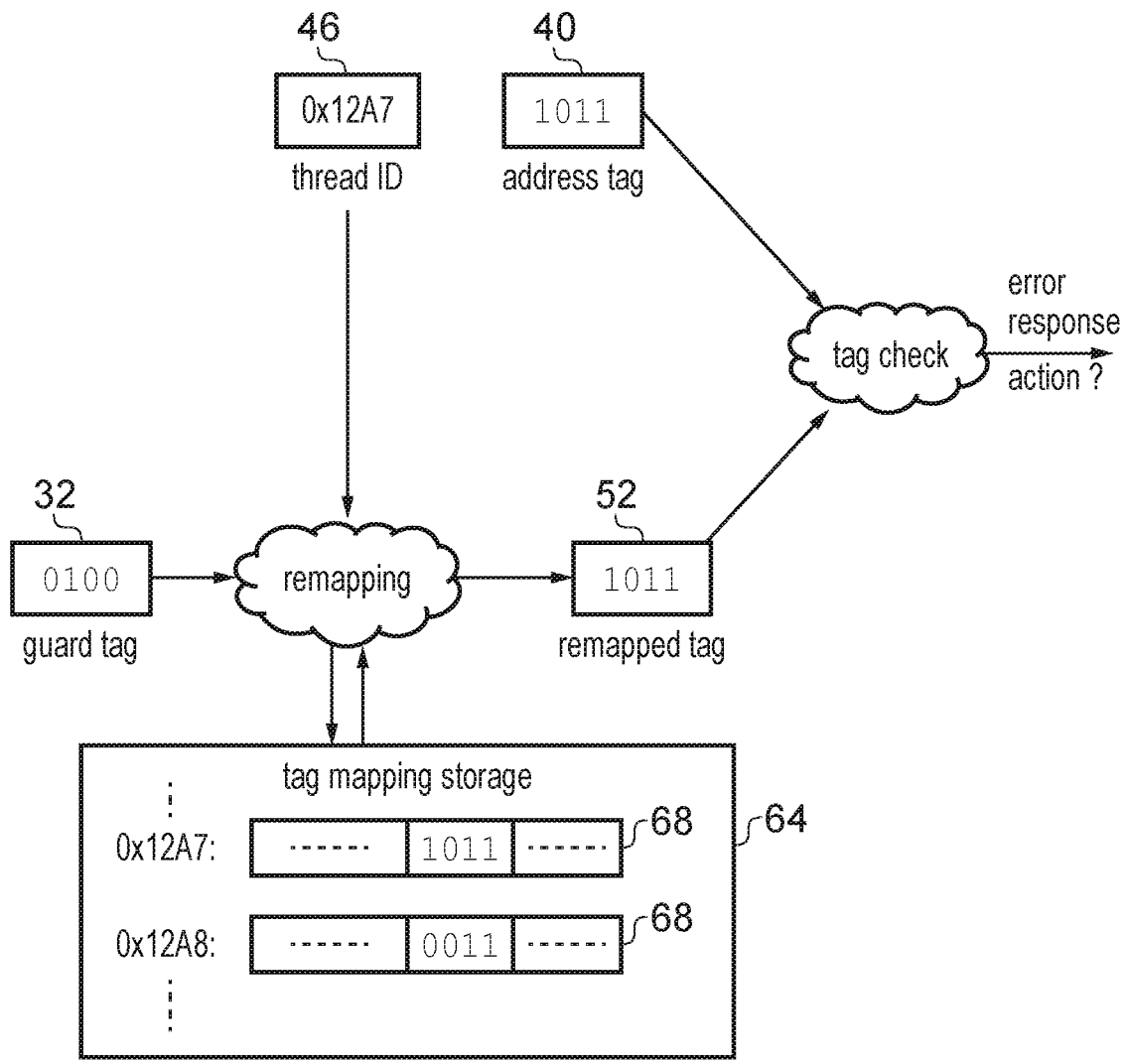
FIG. 11 shows an example tag check involving selecting a set of mapping information to use based on a thread being executed.

In addition to or instead of providing a set of mapping information for each type of access, each set of mapping information may be associated with a particular thread executable by the processing circuitry 4. FIG. 11 shows an example tag check involving selecting a mapping to use based on the thread being executed. In this example, when remapping the guard tag 32, the set of mapping information to use is selected based on the thread executing on the processing circuitry 4. The tag mapping storage circuitry 64 is arranged to store a plurality of sets of mapping information corresponding to different threads and the thread ID 46 of the thread executing on the processing circuitry 4 is used to identify which set of mapping information to use. As shown in FIG. 11, the thread ID 64 is 0x12A7 and so the set of mapping information associated with thread 0x12A7 is used to map the guard tag 32 to remapped tag 52 having a value of 0b1011. This remapped tag value 52 is compared with the address tag 40 in the tag check. In this case, the tags have the same value so no mismatch is detected and no error response is performed. However, if the same address tag 40 were used by another thread executing on the processing circuitry 4, such as a thread having a thread ID of 0x12A8, the guard tag 32 would be remapped using the mapping information associated with that thread ID to produce a remapped tag value of 0b0011. Consequently, the tag check would detect a mismatch between the remapped tag 52 and the address tag 40 and so an error response action would be performed. Thus, this technique can detect a thread attempting to reuse an address tag 40 that may have been validly generated for use by a different thread, which can help to sandbox threads from each other.

As illustrated in FIG. 11, the tag mapping storage circuitry 64 is configured to store a plurality of sets of mapping information in a bank of mapping registers 68. In this way, mapping information corresponding to several threads may be stored in the tag mapping storage circuitry 64 at the same time. Instead, the tag mapping storage circuitry 64 may be configured to store a limited number (e.g., one) of sets of mapping information at one time. Where one set of mapping information is stored in the tag mapping storage circuitry 64, the set of mapping information stored may be the set of mapping information corresponding to the thread executing on the processing circuitry 4 at the time. When a context switch occurs to cause the processing circuitry 4 to execute a different thread, the memory access circuitry 15 may be arranged to replace the mapping information stored in the tag mapping storage circuitry 64 with the set of mapping information associated with the thread to be executed. This approach reduces the amount of storage required by the tag mapping storage circuitry 64.

FIG. 12 schematically illustrates an apparatus comprising tag checking circuitry 62, tag mapping circuitry storage circuitry 64 and tag mapping setting circuitry 66. In this example, tag mapping setting circuitry 66 is provided to operate in response to a request for a new or updated set of mapping information to provide such a new or updated set of mapping information to the tag mapping storage circuitry 64. Functionality to specify how and when the mapping information should be set or updated can be provided. The tag mapping setting circuitry 66 may be responsive to a plurality of types of request specifying how the new set of mapping information is to be generated. Examples of types of request and corresponding behaviour of the tag mapping setting circuitry 66 that may be supported by the tag mapping setting circuitry 66 are set out below with reference to FIGS. 13 to 16.

In the below examples, the term address tag value is used to refer to the value of the address tag that would lead to a match in the tag check when compared with the corresponding guard tag. This may be the same as the remapped tag value. In the below examples, the address tag values have been set so that each guard tag value is associated with a different address tag value, tag mapping setting circuitry 66 may support setting guard tag values so that each address tag value is associated with a different guard tag values.

FIG. 13 shows an example in which the tag mapping setting circuitry 66 is configured to set a tag mapping in response to a request specifying that each guard tag value is associated with a different address tag value. Such a request is referred to in FIG. 13 as a shuffle request. As can be seen in FIG. 13, the mapping generated by the tag mapping setting circuitry 66 by such a shuffling request indicates that each address tag value is assigned to no more than one guard tag value. In this example, since the number of possible guard tag values is the same as the number of possible address tag values, each address tag value is assigned to exactly one address tag value, however, in general where the length of the address tag and the guard tag may differ, this may not be the case. When generating a new mapping, it may be desirable to have all of the guard tags mapped to different address tags to avoid the situation where the same address tag value is associated with different guard tag values since an address tag having one of these address tag values could match with a guard tag associated with the same address tag value even though access is not that memory location is not to be permitted. The selection as to which address tag value is associated with each guard tag may be random. FIG. 13 illustrates an example in which 3-bit values are used for each of the guard tag values and address tag values but it will be appreciated that these techniques are also applicable for tag values of other lengths including where the address tags have a different length to the guard tags.

FIG. 14 shows an example of setting a tag mapping in which certain address tag values are excluded from selection. The tag mapping setting circuitry 66 is configured to operate in response to a request which specifies one or more excluded tag values that are to be excluded from selection. As shown in FIG. 14, this may be indicated by the use of an exclude mask comprising a field for each possible address tag value to indicate for each address tag value, whether the address tag value is to be excluded from selection. In this example, a value of one indicates that the address tag value is to be excluded from selection, however, it will be appreciated that a different mapping could be used. In response to the exclude mask, the tag mapping setting circuitry is configured to generate a set of mapping information for which the excluded address tag values are not assigned to a guard tag value. In this example, a 3-bit guard tag value and a 4-bit address tag value are used. It will be appreciated that where certain values are excluded from selection such as through the use of the exclude mask, if each guard tag value is to be assigned a different address tag value, there need to be more possible address tag values than guard tag values and so a longer address tag is used. However, in some examples, reuse of the same address tag values for different guard tag values may be acceptable. Therefore, in such examples, the exclude mask may be used even if the address tag and the guard tag have the same number of bits. Although this would increase the probability of a false match being detected in the tag check, it could nonetheless be useful to increase me isolation between threads/sandboxes by providing them with non-overlapping sets of tag values in their mapping information. Whether this approach is taken or a longer address tag is provided to ensure that each guard tag is assigned to a different address tag value may be based on the relative priority of sandboxing between threads of a process and detecting memory errors within a thread. In some examples, the apparatus 2 may be configured to support both approaches with software able to indicate a selected approach by setting configuration information in a control register to set the length of the remapped address tags to use. In some implementations, updates to any control information used to control how tag mapping is performed may be restricted to software at a certain privilege level or higher (e.g. restricted to operating system or hypervisor software, so that application-level code is not allowed to set the control information).

FIG. 15 shows an example of updating a tag mapping in which certain guard tag values are excluded from the update. These guard tag values are indicated as 'pinned' values for which the mapping should not change. As illustrated in FIG. 15, the guard tag values which should be excluded from the update may be indicated using an update mask comprising a field for each possible guard tag value to indicate whether the guard tag value is to be excluded. In the example of FIG. 15, a value of one indicates that the mapping is to be excluded from the update but it will be appreciated that other mappings could be used. The mapping information before and after the update is shown in FIG. 15 with asterisks to identify the mappings which are indicated as excluded from the update by the update mask. It can be seen that these mappings are the same before and after the update. The other mappings have been updated by the tag mapping setting circuitry 66. It may be desirable to ensure that certain mappings that are not changed when a set of mapping information is updated. By ensuring that certain mappings are 'pinned', the tag mapping setting circuitry 66 may ensure that the mappings that are for guard tags associated with blocks containing the memory locations to be shared will not be changed and so a common address tag for the different threads may be used to access those location. The tag mapping setting circuitry 66 may also avoid assigning the tag values associated with the 'pinned' tag values when performing the update. This is seen in FIG. 15 since the address tag values 1001, 1110, and 0101 associated with the 'pinned' guard tag values, 010, 011, and 101 are not assigned to any of the other guard tag values.

FIG. 16 shows an example of setting a tag mapping in which all guard tag values are mapped to the same address tag value. This may be desirable to effectively disable the tag checking functionality since as long as the address tag provided has the same value as the address tag value to which all of the guard tag values are mapped, match will be detected. This may be particularly advantageous when dealing with legacy code which does not support tag-guarded accesses. In this case, all of the guard tag values may be set to a default value of the address tag that may be supplied. As explained above, in some architectures the address tag may be determined from bits of the target address that would otherwise all be set to a given value. Where the given value is not replaced in the target address by the address tag (such as in legacy code), these bits may nonetheless be interpreted as an address tag when performing a tag check, and by mapping all of the guard tag values to a default value of these bits, all accesses may be allowed without having to provide a means for bypassing the tag check entirely. As shown in FIG. 16, all of the guard tag values are mapped to the address tag value 0b1111, however, it will be appreciated that another value could be used instead.

FIG. 17 illustrates a simulator implementation that may be used. Whilst the earlier described embodiments implement the present invention in terms of apparatus and methods for operating specific processing hardware supporting the techniques concerned, it is also possible to provide an instruction execution environment in accordance with the embodiments described herein which is implemented through the use of a computer program. Such computer programs are often referred to as simulators, insofar as they provide a software based implementation of a hardware architecture. Varieties of simulator computer programs include emulators, virtual machines, models, and binary translators, including dynamic binary translators. Typically, a simulator implementation may run on a host processor 230, optionally running a host operating system 220, supporting the simulator program 210. In some arrangements, there may be multiple layers of simulation between the hardware and the provided instruction execution environment, and/or multiple distinct instruction execution environments provided on the same host processor. Historically, powerful processors have been required to provide simulator implementations which execute at a reasonable speed, but such an approach may be justified in certain circumstances, such as when there is a desire to run code native to another processor for compatibility or reuse reasons. For example, the simulator implementation may provide an instruction execution environment with additional functionality which is not supported by the host processor hardware, or provide an instruction execution environment typically associated with a different hardware architecture. An overview of simulation is given in "Some Efficient Architecture Simulation Techniques", Robert Bedichek, Winter 1990 USENIX Conference, pages 53-63.

To the extent that embodiments have previously been described with reference to particular hardware constructs or features, in a simulated embodiment, equivalent functionality may be provided by suitable software constructs or features. For example, particular circuitry may be implemented in a simulated embodiment as computer program logic. Similarly, memory hardware, such as a register or cache, may be implemented in a simulated embodiment as a software data structure. In arrangements where one or more of the hardware elements referenced in the previously described embodiments are present on the host hardware (for example, host processor 230), some simulated embodiments may make use of the host hardware, where suitable.

The simulator program 210 may be stored on a computer-readable storage medium 212 (which may be a non-transitory medium), and provides a program interface (instruction execution environment) to the target code 200 (which may include applications, operating systems and a hypervisor) which is the same as the interface of the hardware architecture being modelled by the simulator program 210. Thus, the program instructions of the target code 200 may be executed from within the instruction execution environment using the simulator program 210, so that a host computer 230 which does not actually have the hardware features of the apparatus 2 discussed above can emulate these features. For example, the simulator program 210 may include tag checking program logic 214 for identifying a guard tag, performing a tag check and in response to detecting a mismatch in the tag check, performing an error response action in a corresponding manner to the manner in which the analogous tag checking circuitry 62 of the hardware embodiment would perform these functions. Also, the simulator program 210 may include tag mapping maintenance program logic 216 for maintaining mapping information indicative of a mapping between guard tag values and corresponding address tag values (analogous to the tag mapping storage circuitry 64 described above).

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
   tag checking circuitry responsive to a target address to:
   identify a guard tag stored in a memory system in association with a block of one or more memory locations, the block containing a target memory location identified by the target address;
   perform a tag check based on the guard tag and an address tag associated with the target address; and
   in response to detecting a mismatch in the tag check, perform an error response action; and
   tag mapping storage circuitry to store mapping information indicative of a mapping between guard tag values and corresponding address tag values;
   wherein, the tag checking circuitry is configured to remap at least one of the guard tag and the address tag based on the mapping information stored by the tag mapping storage circuitry to generate a remapped tag for use in the tag check.

2. The apparatus according to claim 1, wherein: the tag checking circuitry is configured to remap the address tag and the remapped tag is a remapped address tag.

3. The apparatus according to claim 1, wherein: the tag checking circuitry is configured to remap the guard tag and the remapped tag is a remapped guard tag.

4. The apparatus according to claim 1, wherein: the remapped tag is longer than said at least one of the address tag and the guard tag.

5. The apparatus according to claim 1, wherein: the tag checking circuitry is configured to perform the tag check in response to a memory access request specifying the target address, the memory access request having one of a plurality of access types; and
   for a given item of mapping information providing a mapping between a given guard tag value and a given address tag value, the tag checking circuitry is configured to limit which of the plurality of access types of memory access request are allowed to access a memory location in a block associated with a guard tag having the given guard tag value when the address tag of the memory access request specifies the given address tag value.

6. The apparatus according to claim 1, wherein: the mapping information specifies a plurality of remapped tag value fields; and the tag checking circuitry is configured to select one of the plurality of remapped tag value fields based on a value of said at least one of the guard tag and the address tag, and to determine the remapped tag based on a remapped tag value specified in the selected remapped tag value field.

7. The apparatus according to claim 6, wherein: the tag checking circuitry is configured to perform the tag check in response to a memory access request specifying the target address, the memory access request having one of a plurality of access types; and the tag checking circuitry is configured to determine whether said one of the plurality of access types is permitted based on permissions information specified in the selected remapped tag value field.

8. The apparatus according to claim 1, wherein: the tag checking circuitry is configured to perform the tag check in response to a memory access request specifying the target address, the memory access request having one of a plurality of access types; the tag mapping storage circuitry is configured to store different sets of mapping information corresponding to different access types; and the tag checking circuitry is configured to select, based on said one of the plurality of access types associated with the memory access request, which set of mapping information to use to generate the remapped tag for use in the tag check.

9. The apparatus according to claim 1, wherein: the mapping information is associated with a particular thread executable by processing circuitry; and the mapping information is indicative of a mapping for use in response to a target address generated by the processing circuitry when executing the particular thread.

10. The apparatus according to claim 1, wherein: the apparatus comprises tag mapping setting circuitry configured to set, in response to a tag mapping update request, the tag mapping storage circuitry to indicate a new set of mapping information that indicates that each value of said at least one of the guard tag and the address tag is associated with a different remapped tag value.

11. The apparatus according to claim 1, wherein: the apparatus comprises tag mapping setting circuitry configured to set, in response to a tag mapping update request which specifies one or more excluded tag values that are to be excluded from selection as remapped tag values, the tag mapping storage circuitry to indicate a new set of mapping information that indicates that each value of said one of the guard tag and the address tag is associated with a remapped tag value other than the one or more excluded tag values.

12. The apparatus according to claim 1, wherein: the apparatus comprises tag mapping setting circuitry configured to set, in response to a tag mapping update request which specifies one or more existing tag mappings that are to be excluded from the update, the tag mapping storage circuitry to update tag mappings other than the one or more existing tag mappings.

13. The apparatus according to claim 1, wherein: the error response action comprises one of: placing an indication that the tag check detected a mismatch in a status register; recording an entry in an error report; signaling a fault; and denying access to the memory location specified by the target address.

14. A method comprising:

in response to a target address:

identifying a guard tag stored in a memory system in association with a block of one or more memory locations, the block containing a target memory location identified by the target address;

performing a tag check based on the guard tag and an address tag associated with the target address; and performing, in response to detecting a mismatch in the tag check, an error response action;

wherein the method comprises remapping at least one of the guard tag and the address tag based on mapping information indicative of a mapping between guard tag values and corresponding address tag values to generate a remapped tag for use in the tag check.

15. A non-transitory computer-readable storage medium comprising a computer program for controlling a host data processing apparatus to provide an instruction execution environment comprising:

tag checking program logic responsive to a target address to: identify a guard tag stored in a memory system in association with a block of one or more memory locations, the block containing a target memory location identified by the target address; perform a tag check based on the guard tag and an address tag associated with the target address; and in response to detecting a mismatch in the tag check, perform an error response action; and tag mapping maintenance program logic to maintain mapping information indicative of a mapping between guard tag values and corresponding address tag values;

wherein the tag checking program logic is configured to remap at least one of the guard tag and the address tag based on the mapping information maintained by the tag mapping maintenance program logic to generate a remapped tag for use in the tag check.

* * * * *